US010755605B2

(12) United States Patent
Enriquez

(10) Patent No.: US 10,755,605 B2
(45) Date of Patent: Aug. 25, 2020

(54) POLYGONAL DISPLAY AND METHOD FOR FORMING THE SAME

(71) Applicant: R.R. Donnelley & Sons Company, Chicago, IL (US)

(72) Inventor: Carlos Enriquez, Pleasant Prairie, WI (US)

(73) Assignee: R.R. Donnelley & Sons Company, Chicago, IL (US)

( * ) Notice: Subject to any disclaimer, the term of this patent is extended or adjusted under 35 U.S.C. 154(b) by 459 days.

(21) Appl. No.: 15/415,594

(22) Filed: Jan. 25, 2017

(65) Prior Publication Data

US 2018/0211571 A1 Jul. 26, 2018

(51) Int. Cl.
*B32B 3/10* (2006.01)
*G09F 1/06* (2006.01)

(52) U.S. Cl.
CPC .................................... *G09F 1/065* (2013.01)

(58) Field of Classification Search
None
See application file for complete search history.

(56) References Cited

U.S. PATENT DOCUMENTS 822,841 A 6/1906 Hill
956,916 A 5/1910 Wiederseim, Jr.
1,028,147 A 6/1912 Stranders
1,545,771 A 7/1925 Hout
1,576,672 A 3/1926 Miller
1,656,341 A 1/1928 Smith
1,670,464 A 5/1928 Marsh
1,687,616 A 10/1928 Huye
1,902,566 A 3/1933 Marsh
2,108,349 A 2/1938 Rasmussen
(Continued)

FOREIGN PATENT DOCUMENTS

CN 1387175 A 12/2002
CN 101061527 10/2007
(Continued)

OTHER PUBLICATIONS

United States Patent and Trademark Office, "Office Action," issued in connection with U.S. Appl. No. 15/261,178, dated Sep. 29, 2017, 46 pages.

(Continued)

*Primary Examiner* — Christopher M Polley
(74) *Attorney, Agent, or Firm* — Hanley, Flight & Zimmerman, LLC

(57) ABSTRACT

In one example, a triangular display includes a first substrate, a second substrate coupled to and disposed in opposition to the first substrate, a first line of weakness formed along an axial direction of the first substrate to define a first section and a second section, a second line of weakness formed along an axial direction of the second substrate to define a third section and a fourth section and a former having a first side, the former extending between the first section and the third section, and in a deployed position, at least one of the first section or the second section has rotated about the first line of weakness and at least one of the third section or the fourth section has rotated about the second line of weakness to place the second section and the fourth section adjacent to the first side of the former.

24 Claims, 12 Drawing Sheets

(56) References Cited

U.S. PATENT DOCUMENTS

| | | | |
|---|---|---|---|
| 2,113,288 | A | 4/1938 | Berger |
| 2,142,826 | A | 1/1939 | Rosello |
| 2,153,460 | A | 4/1939 | Giles |
| 2,210,317 | A | 8/1940 | Dueringer |
| 2,283,406 | A | 5/1942 | Bacon |
| 2,290,144 | A | 7/1942 | Katz |
| 2,404,089 | A | 7/1946 | Pollock |
| 2,601,374 | A | 6/1952 | Ditzler et al. |
| 2,637,924 | A | 5/1953 | Hutt |
| 2,728,461 | A | 12/1955 | Paige |
| 2,773,324 | A | 12/1956 | Drueck, Jr. |
| 2,833,074 | A | 5/1958 | Jannes |
| 2,892,276 | A | 6/1959 | Nelson |
| 2,918,178 | A | 12/1959 | Leone |
| 2,984,920 | A | 5/1961 | Acosta et al. |
| 3,015,898 | A | 1/1962 | Keeslar |
| 3,091,877 | A | 6/1963 | Luchsinger |
| 3,234,682 | A | 2/1966 | Frankl |
| 3,267,597 | A | 8/1966 | Jannes |
| 3,302,321 | A | 2/1967 | Walker |
| 3,571,958 | A | 3/1971 | Stevens et al. |
| 3,665,669 | A | 5/1972 | Huber |
| 3,666,607 | A | 5/1972 | Weissman |
| 4,234,148 | A | 11/1980 | Maddestra et al. |
| 4,610,363 | A | 9/1986 | Flum et al. |
| 4,619,426 | A | 10/1986 | Drueck, Jr. |
| 4,750,283 | A | 6/1988 | Halpern |
| 4,770,379 | A | 9/1988 | Estvold |
| 4,773,622 | A | 9/1988 | Herlin |
| 4,774,780 | A | 10/1988 | Crowell |
| 4,790,714 | A | 12/1988 | Schnapp |
| 4,854,060 | A | 8/1989 | Corbo et al. |
| 4,940,199 | A | 7/1990 | Hall |
| 4,984,848 | A | 1/1991 | Scalisi et al. |
| 4,993,846 | A | 2/1991 | Diamond et al. |
| 5,000,717 | A | 3/1991 | Pfeiffer |
| 5,090,349 | A | 2/1992 | Wilson |
| 5,193,466 | A | 3/1993 | Eder |
| 5,197,631 | A | 3/1993 | Mishima |
| 5,297,677 | A | 3/1994 | Burian et al. |
| 5,416,997 | A | 5/1995 | Dyment et al. |
| 5,454,180 | A | 10/1995 | Volpe |
| 5,467,547 | A | 11/1995 | Fortner |
| 5,632,390 | A | 5/1997 | Podergois |
| 5,752,649 | A | 5/1998 | Weder |
| 5,758,438 | A | 6/1998 | Crowell |
| 5,778,959 | A | 7/1998 | Guetschow |
| 5,787,621 | A | 8/1998 | Leksell |
| 5,809,673 | A | 9/1998 | Johnson et al. |
| 5,868,367 | A | 2/1999 | Smith |
| 5,878,945 | A | 3/1999 | Weder |
| 5,937,553 | A | 8/1999 | Maran |
| 5,966,857 | A | 10/1999 | Pettersson et al. |
| 5,983,538 | A | 11/1999 | Crowell |
| 6,311,418 | B1 | 11/2001 | Crowell |
| 6,347,772 | B1 | 2/2002 | L'Hôtel |
| 6,497,601 | B1 | 12/2002 | Ward |
| 7,134,230 | B1 | 11/2006 | Boens et al. |
| 7,159,350 | B2 | 1/2007 | L'Hotel |
| 7,234,253 | B2 | 6/2007 | Ossmann |
| 7,437,842 | B2 | 10/2008 | Sgambellone |
| 7,634,865 | B2 | 12/2009 | L'Hôtel |
| 7,726,054 | B2 | 6/2010 | Mestres Armengol et al. |
| 7,774,964 | B2 | 8/2010 | L'Hôtel |
| 7,980,013 | B2 | 7/2011 | Hsu |
| 7,980,016 | B2 | 7/2011 | L'Hotel |
| 8,099,883 | B2 | 1/2012 | Mestres Armengol et al. |
| 8,112,925 | B2 | 2/2012 | Tzuo |
| 8,291,631 | B2 | 10/2012 | Wilder |
| 8,458,939 | B2 | 6/2013 | Arthur et al. |
| 8,590,188 | B2 | 11/2013 | Mirsch |
| 8,701,321 | B2 | 4/2014 | Da Fonseca et al. |
| 8,776,415 | B2 | 7/2014 | Kawaguchi et al. |
| 8,826,833 | B1 | 9/2014 | Fischer et al. |
| 8,863,418 | B2 | 10/2014 | Acker et al. |
| 8,875,908 | B2 | 11/2014 | L'Hotel |
| 9,123,262 | B1 | 9/2015 | Frost |
| 9,173,485 | B2 | 11/2015 | Fischer et al. |
| 9,715,840 | B1 | 7/2017 | Ivarmus |
| 9,734,734 | B2 | 8/2017 | Lyon |
| 9,779,640 | B2 | 10/2017 | Ruhaak |
| 9,812,038 | B2 | 11/2017 | Lyon |
| 9,978,292 | B2 | 5/2018 | Santoro, Jr. |
| 10,008,138 | B2 | 6/2018 | Bonifas |
| 10,170,020 | B2 | 1/2019 | Cwidak et al. |
| 10,223,939 | B2 | 3/2019 | Warmus |
| 10,685,588 | B2 | 6/2020 | Lyon |
| 2004/0111930 | A1 | 6/2004 | Ossmann |
| 2006/0260165 | A1 | 11/2006 | Chenel |
| 2007/0245610 | A1 | 10/2007 | Mestres Armengol et al. |
| 2007/0294925 | A1 | 12/2007 | L'Hotel |
| 2008/0066353 | A1 | 3/2008 | Mills |
| 2008/0083146 | A1 | 4/2008 | Martin Presa |
| 2010/0043261 | A1 | 2/2010 | Arthur et al. |
| 2010/0072330 | A1 | 3/2010 | Tzuo |
| 2011/0088300 | A1 | 4/2011 | Martin Presa |
| 2011/0179685 | A1 | 7/2011 | Mirsch |
| 2012/0012734 | A1 | 1/2012 | Tzuo |
| 2012/0227297 | A1* | 9/2012 | Kawaguchi ............... G09F 1/06 40/610 |
| 2013/0192110 | A1 | 8/2013 | Da Fonseca et al. |
| 2013/0219760 | A1 | 8/2013 | Acker et al. |
| 2014/0205772 | A1 | 7/2014 | Sitton |
| 2014/0265777 | A1 | 9/2014 | Fischer et al. |
| 2015/0265070 | A1 | 9/2015 | Mestres Armengol et al. |
| 2016/0335925 | A1 | 11/2016 | Ruhaak |
| 2016/0335934 | A1 | 11/2016 | Lyon |
| 2016/0335935 | A1 | 11/2016 | Lyon |
| 2017/0193866 | A1 | 7/2017 | Bonifas |
| 2017/0213485 | A1 | 7/2017 | Santoro, Jr. |
| 2017/0249874 | A1* | 8/2017 | Lopez Fern Ndez ... G09F 1/065 |
| 2017/0294149 | A1 | 10/2017 | Lyon |
| 2018/0040262 | A1 | 2/2018 | Lyon |
| 2018/0075781 | A1 | 3/2018 | Cwidak et al. |
| 2018/0075788 | A1 | 3/2018 | Warmus et al. |
| 2018/0211571 | A1 | 7/2018 | Enriquez |
| 2018/0268748 | A1 | 9/2018 | Enriquez |
| 2019/0066550 | A1 | 2/2019 | Enriquez |
| 2019/0279534 | A1 | 9/2019 | Lyon |
| 2020/0168127 | A1 | 5/2020 | Santoro |

FOREIGN PATENT DOCUMENTS

| | | |
|---|---|---|
| CN | 101473360 | 7/2009 |
| CN | 102005160 | 4/2011 |
| CN | 202711641 U | 1/2013 |
| CN | 203192354 | 9/2013 |
| CN | 204257165 | 4/2015 |
| CN | 205722637 | 11/2016 |
| DE | 2658506 | 1/1978 |
| DE | 4005925 | 10/1991 |
| DE | 4314654 | 11/1994 |
| DE | 9320993 | 8/1995 |
| DE | 202010015312 | 1/2011 |
| DE | 202011002980 | 4/2011 |
| DE | 202014106297 | 3/2015 |
| DK | 9500055 | 5/1995 |
| DK | 9500277 | 9/1995 |
| EP | 1741368 | 1/2007 |
| EP | 1830334 | 9/2007 |
| EP | 1926076 | 5/2008 |
| EP | 2290637 | 3/2011 |
| EP | 2400477 | 12/2011 |
| ES | 2212927 | 8/2004 |
| ES | 2255857 | 7/2006 |
| FR | 1254983 | 3/1961 |
| FR | 2210317 | 7/1974 |
| FR | 2232259 | 12/1974 |
| FR | 2233912 | 1/1975 |
| FR | 2571949 | 4/1986 |
| FR | 2574968 | 6/1986 |
| FR | 2650907 | 2/1991 |
| FR | 2680030 | 2/1993 |
| FR | 2691621 | 12/1993 |

(56) References Cited

FOREIGN PATENT DOCUMENTS

| | | | |
|---|---|---|---|
| FR | 2730148 | | 8/1996 |
| FR | 2735264 | | 12/1996 |
| FR | 2745109 | | 8/1997 |
| FR | 2760801 | | 9/1998 |
| FR | 2760802 | | 9/1998 |
| FR | 2760880 | | 9/1998 |
| FR | 2770320 | | 4/1999 |
| FR | 2911425 | | 7/2008 |
| FR | 2925203 | | 6/2009 |
| FR | 2925204 | | 6/2009 |
| FR | 2929035 | | 9/2009 |
| FR | 2948222 | | 1/2011 |
| GB | 463574 | | 4/1937 |
| GB | 740577 | | 11/1955 |
| GB | 743378 | | 1/1956 |
| GB | 824004 | | 11/1959 |
| GB | 1034280 | | 6/1966 |
| GB | 1272187 | | 4/1972 |
| GB | 1317155 | | 5/1973 |
| JP | 2003530602 | | 10/2003 |
| WO | 9634379 | | 10/1996 |
| WO | 9936900 | | 7/1999 |
| WO | 2002095719 | | 11/2002 |
| WO | 2004044867 | | 5/2004 |
| WO | 2006040438 | | 4/2006 |
| WO | 2006067252 | | 6/2006 |
| WO | 2007138083 | | 12/2007 |
| WO | 2008049176 | | 5/2008 |
| WO | 2008125703 | | 10/2008 |
| WO | 2010019086 | | 2/2010 |
| WO | 2010130485 | | 11/2010 |
| WO | 2011092209 | | 8/2011 |
| WO | 2011113123 | | 9/2011 |
| WO | 2012061375 | | 5/2012 |
| WO | 2012164114 | | 12/2012 |
| WO | 2016057067 | | 4/2016 |
| WO | 2016071868 | | 5/2016 |
| WO | 2017116605 | A1 | 7/2017 |
| WO | 2018027118 | | 2/2018 |

OTHER PUBLICATIONS

International Searching Authority, "International Search Report," issued in connection with PCT Patent Application No. PCT/US2017/045471, dated Oct. 18, 2017, 5 pages.

International Searching Authority, "Written Opinion," issued in connection with PCT Patent Application No. PCT/US2017/045471, dated Oct. 18, 2017, 6 pages.

United States Patent and Trademark Office, "Final Office Action," issued in connection with U.S. Appl. No. 14/988,616, dated Oct. 30, 2017, 28 pages.

United States Patent and Trademark Office, "Notice of Allowance," issued in connection with U.S. Appl. No. 15/261,178, dated Aug. 3, 2018, 5 pages.

United States Patent and Trademark Office, "Non-Final Office Action," issued in connection with U.S. Appl. No. 15/415,587, dated Aug. 4, 2017, 40 pages.

United States Patent and Trademark Office, "Notice of Allowance," issued in connection with U.S. Appl. No. 14/709,285, dated Jul. 3, 2017, 19 pages.

United States Patent and Trademark Office, "Notice of Allowance," issued in connection with U.S. Appl. No. 14/988,616, dated Feb. 28, 2018, 8 pages.

United States Patent and Trademark Office, "Notice of Allowance," issued in connection with U.S. Appl. No. 15/415,587, dated Jan. 19, 2018, 7 pages.

United States Patent and Trademark Office, "Final office action," issued in connection with U.S. Appl. No. 15/261,178, dated Apr. 11, 2018, 21 pages.

United States Patent and Trademark Office, "Non-Final Office action", issued in connection with U.S. Appl. No. 15/786,405, dated Oct. 2, 2018, 31 pages.

United States Patent and Trademark Office, "Restriction Requirement", issued in connection with U.S. Appl. No. 15/261,191, dated Aug. 31, 2018, 6 pages.

United States Patent and Trademark Office, "Non-Final Office Action," issued in connection with U.S. Appl. No. 14/709,266, dated May 23, 2016, 32 pages.

United States Patent and Trademark Office, "Notice of Allowance," issued in connection with U.S. Appl. No. 14/709,266, dated Sep. 26, 2016, 31 pages.

United States Patent and Trademark Office, "Non-Final Office Action," issued in connection with U.S. Appl. No. 14/709,285, dated Sep. 15, 2016, 38 pages.

United States Patent and Trademark Office, "Non-Final Office Action," issued in connection with U.S. Appl. No. 14/711,739, dated Sep. 16, 2016, 91 pages.

United States Patent and Trademark Office, "Non-Final Office Action," issued in connection with U.S. Appl. No. 15/229,920, dated Dec. 1, 2016, 9 pages.

International Searching Authority, "International Search Report and Written Opinion", issued in connection with PCT Application No. PCT/US2016/064478, dated Jan. 24, 2017, 15 pages.

United States Patent and Trademark Office, "Final Office Action," issued in connection with U.S. Appl. No. 14/709,285, dated Mar. 15, 2017, 24 pages.

United States Patent and Trademark Office, "Notice of Allowance," issued in connection with U.S. Appl. No. 15/229,920, dated Mar. 22, 2017, 43 pages.

United States Patent and Trademark Office, "Final Office Action," issued in connection with U.S. Appl. No. 14/711,739, dated Mar. 21, 2017, 19 pages.

United States Patent and Trademark Office, "Non-Final Office Action," issued in connection with U.S. Appl. No. 14/988,616, dated Apr. 11, 2017, 36 pages.

United States Patent and Trademark Office, "Notice of Allowance," issued in connection with U.S. Appl. No. 14/709,266, dated Apr. 12, 2017, 17 pages.

United States Patent and Trademark Office, "Notice of Allowance," dated Feb. 6, 2020 in connection with U.S. Appl. No. 16/421,116, 7 pages.

United States Patent and Trademark Office, "Notice of Allowance," dated Feb. 27, 2020 in connection with U.S. Appl. No. 16/201,535, 8 pages.

China National Intellectual Property Administration (CNIPA), "First Office Action," dated Oct. 24, 2019, in connection with Chinese Patent Application No. 201810209272.0, 13 pages (Full document and English translation).

United States Patent and Trademark Office, "Non-Final Office Action," dated Oct. 11, 2019 in connection with U.S. Appl. No. 15/690,031, 7 pages.

China National Intellectual Property Administration (CNIPA), "Notice of Allowance," dated Nov. 12, 2019 in connection with Chinese Patent Application No. 201710340752.6, 7 pages (full document and English translation).

United States Patent and Trademark Office, "Notice of Allowance," dated Oct. 17, 2019 in connection with U.S. Appl. No. 15/261,191, 6 pages.

United States Patent and Trademark Office, "Corrected Notice of Allowance," dated Dec. 26, 2019 in connection with U.S. Appl. No. 15/261,191, 3 pages.

United States Patent and Trademark Office, "Non-Final Office Action," issued in connection with U.S. Appl. No. 15/634,974, dated Apr. 9, 2018, 7 pages.

United States Patent and Trademark Office, "Notice of Allowance," issued in connection with U.S. Appl. No. 15/786,405, dated Feb. 1, 2019, 9 pages.

United States Patent and Trademark Office, "Non-Final Office Action," issued in connection with U.S. Appl. No. 15/261,191, dated Jan. 23, 2019, 10 pages.

United States Patent and Trademark Office, "Notice of Allowance," issued in connection with U.S. Appl. No. 15/261,191, dated Jul. 1, 2019, 7 pages.

(56) References Cited

OTHER PUBLICATIONS

United States Patent and Trademark Office, "Non-Final Office Action," issued in connection with U.S. Appl. No. 16/201,535, dated Jan. 25, 2019, 13 pages.
United States Patent and Trademark Office, "Non-Final Office Action," issued in connection with U.S. Appl. No. 16/201,535, dated Aug. 8, 2019, 11 pages.
United States Patent and Trademark Office, "Final Office Action," issued in connection with U.S. Appl. No. 15/261,178, dated Apr. 11, 2018, 12 pages.
State Intellectual Property Office of the People's Republic of China, "Notice of Allowance," dated Mar. 16, 2018 in connection with Chinese Patent Application No. 201720947684.5, 4 pages (full document and English translation).
United States Patent and Trademark Office, "Non-Final Office Action," dated Oct. 2, 2018, in connection with U.S. Appl. No. 15/786,405, 8 pages.
State Intellectual Property Office of the People's Republic of China, "First Office Action," dated May 24, 2019 in connection with Chinese Patent Application No. 201710340752.6, 25 pages. Translation not available.
United States Patent and Trademark Office, "Notice of Allowance," dated Sep. 21, 2018 in connection with U.S. Appl. No. 15/909,155, 7 pages.
United States Patent and Trademark Office, "Non-Final Office Action," dated Jun. 25, 2018 in connection with U.S. Appl. No. 15/690,031, 8 pages.
United States Patent and Trademark Office, "Final Office Action," dated Feb. 25, 2019 in connection with U.S. Appl. No. 15/690,031, 9 pages.
United States Patent and Trademark Office, "Non-Final Office Action," dated Apr. 5, 2018 in connection with U.S. Appl. No. 15/657,548, 8 pages.
United States Patent and Trademark Office, "Notice of Allowance," dated Oct. 23, 2018 in connection with U.S. Appl. No. 15/657,548, 8 pages.
United States Patent and Trademark Office, "Notice of Allowance," issued in connection with U.S. Appl. No. 14/711,739, dated Jun. 8, 2017, 9 pages.
United States Patent and Trademark Office, "Final Office Action," issued in connection with U.S. Appl. No. 15/634,974, dated Oct. 25, 2018, 8 pages.
United States Patent and Trademark Office, "Advisory Action," dated Jun. 11, 2019 in connection with U.S. Appl. No. 15/690,031, 3 pages.
United States Patent and Trademark Office, "Restriction Requirement," dated Aug. 31, 2018 in connection with U.S. Appl. No. 15/261,191, 5 pages.
United States Patent and Trademark Office, "Non-Final Office Action," dated Oct. 2, 2019 in connection with U.S. Appl. No. 16/421,116, 7 pages.
United States Patent and Trademark Office, "Notice of Allowance," dated Mar. 30, 2020 in connection with U.S. Appl. No. 15/690,031, 6 pages.
China National Intellectual Property Administration, "Notice for Going Through Patent Registration Formalities," dated Mar. 27, 2020 in connection with Chinese Patent Application No. 201810209272.0, 6 pages.
United States Patent and Trademark Office, "Notice of Allowability," dated Apr. 1, 2020 in connection with U.S. Appl. No. 16/201,535, 3 pages.
United States Patent and Trademark Office, "Corrected Notice of Allowability," dated May 15, 2020 in connection with U.S. Appl. No. 16/421,116, 2 pages.

* cited by examiner

POLYGONAL DISPLAY AND METHOD FOR FORMING THE SAME

FIELD OF THE DISCLOSURE

This disclosure relates generally to displays, methods of making displays, and mechanisms for maintaining such displays in an erect state.

BACKGROUND

Displays may be used at a point of purchase to provide advertising or other information. Some of these displays have a tubular shape and include outwardly facing indicia.

BRIEF DESCRIPTION OF THE DRAWINGS

The figures are not to scale. Wherever possible, the same reference numbers will be used throughout the drawings and accompanying written description to refer to the same or like parts.

DETAILED DESCRIPTION

The examples disclosed herein relate to displays that can be used for point-of-sale advertising, providing information or for other suitable purposes. The example displays disclosed herein are configured to be collapsed to a folded, flat state, which facilitates shipping and transport, and to be readily erected at a location (e.g., a point-of-sale, a conference booth, a store, etc.) to effect a desired display function.

In some examples disclosed herein, the example displays include one or more substrates (e.g., a sheet material, a panel, etc.) that, singly or in combination, form a shroud into which one or more internal support members are disposed or are able to be disposed. In some examples, the deployed shroud defines a generally triangular cross-section which may approximate an equilateral triangle, an isosceles triangle, a scalene triangle, an obtuse triangle, or a right triangle.

A base structure is optionally attached to or integrated with one or more portions of the shroud, such as a base portion, to help to maintain the shroud in a desired orientation.

In some examples, a former is inserted into a shroud formed by one or more substrates. In some examples, the former has a polygonal shape and, during deployment of the shroud, the former moves toward a generally planar position. In some examples, the example polygonal former is provided with a line of weakness to enable the polygonal former to be folded relatively flat within the example shroud for transport, shipping and/or storage.

As is disclosed herein, the triangular display is formed by (1) assembling one or more substrates together with one or more polygonal formers along one or more positions along an axial direction of the one or more substrates (e.g., in a height direction of the substrates) or by (2) deploying a completed triangular display from a folded state.

Turning to the figures, in some examples, an example triangular display 100 includes an example shroud 120 that is formed of one or more elongate substrates 102, 104 having top and bottom edges and first and second side edges. In some examples, transverse lines of weakness 130 are defined across the shroud 120 (see, e.g., FIG. 1) to enable the example triangular display 100 to be folded for transport or shipping and/or storage. These lines of weakness 130 enable the example triangular display 100 to be folded relatively flat, with adjacent segments of the shroud 120 being folding against one-another along the lines of weakness 130, such as in a multi-part z-fold, for example.

Figure 1:
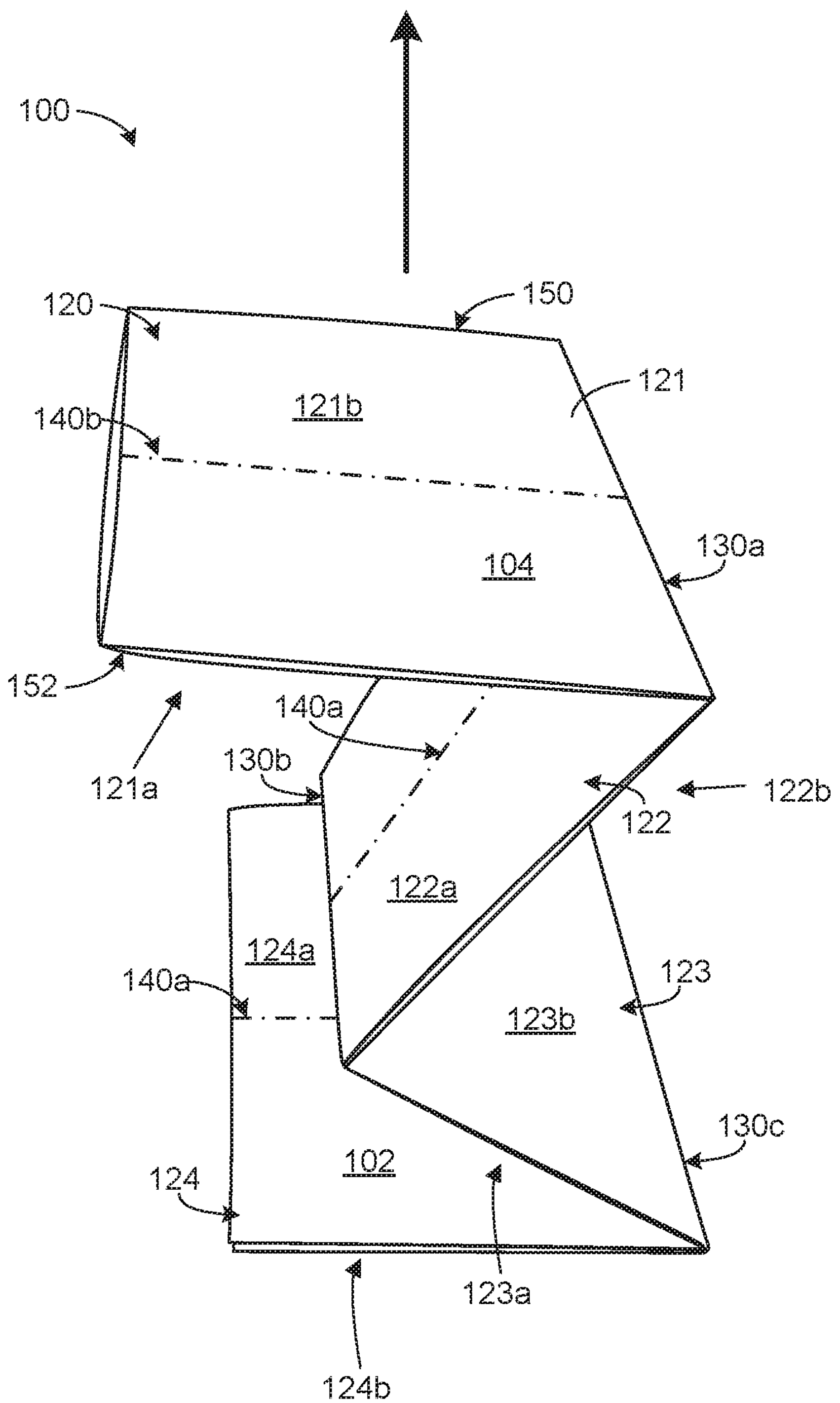
FIG. 1 is a perspective view of an example triangular display in accordance with teachings herein, showing the example display transitioning from a folded state to an erected or deployed state in accordance with teachings herein.
Figure 2:
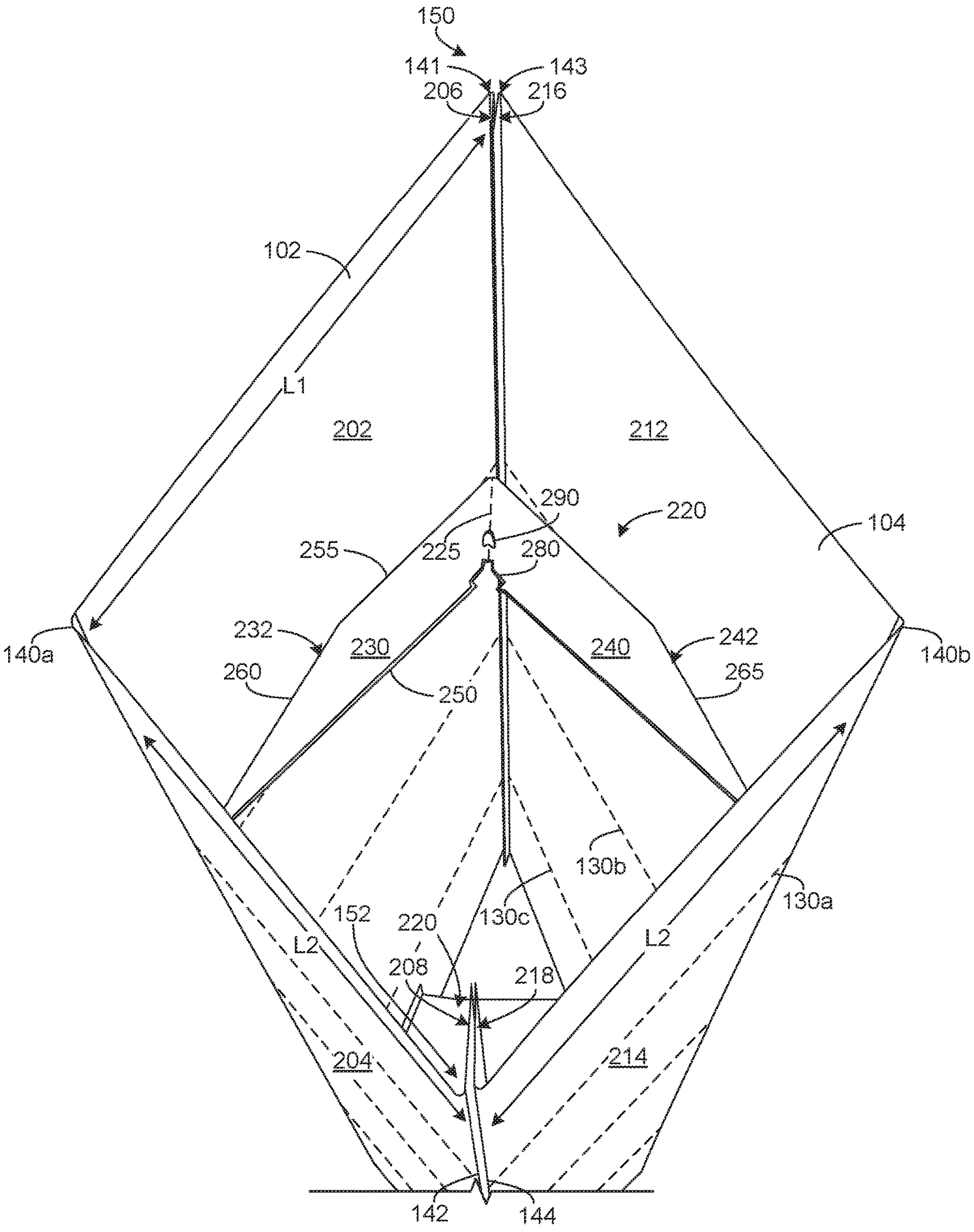
FIG. 2 is a perspective top view of the example triangular display of FIG. 1, showing the example triangular display in an intermediary position of deployment in accordance with teachings herein.

FIGS. 1-2 show an example of erecting the triangular display 100, from a substantially flat initial state (not shown), to the depicted partially unfolded state (FIG. 1) and to a partially-erected state (FIG. 2), in accordance with the teachings herein. In the example four-segment display 100 depicted in FIGS. 1-9, the display 100 is formed from the substrates 102, 104, which are joined together to define the shroud 120 of the triangular display 100.

The substrates 102, 104 each include connection members at lateral portions thereof to permit connection of the substrates 102, 104 to one other. In one example, wherein the triangular display is formed from two substrates 102, 104, substrate 102 has, at lateral portions thereof, connection members in the form of flaps 206, 208 and substrate 104 has, at lateral portions thereof, connection members in the form of flaps 216, 218 (see, e.g., FIG. 2). The first flap 206 is defined by a first axial line of weakness 141, the second flap 208 is defined by a second axial line of weakness 142, the third flap 216 is defined by a third axial line of weakness 143, and the fourth flap 218 is defined by a fourth axial line of weakness 144. When the substrates 102, 104 are placed in opposition to one another such that the flaps 206, 216 and 208, 218 are aligned, the flaps 206, 216 are connected together via one or more connecting elements (e.g., elastic members, snap connectors, clips, hook-and-eye fasteners, hook-and-loop fasteners (e.g., VELCRO® brand fasteners, etc.), pins, snap fasteners, string, twist ties, staples, adhesives, thermal bonding, etc.) to form a first joint 150 and the flaps 208, 218 are connected together via one or more connecting elements to form a second joint 152 (see, e.g., FIG. 2, FIG. 5).

Each substrate 102, 104 may comprise n segments, where n is any number including, but not limited to, one segment, two segments, three segments, four segments (as shown), or more than four segments. In the example shown, the first substrate 102 includes four segments 121*a*, 122*a*, 123*a*, and 124*a*, and the second substrate 104 includes four segments 121*b*, 122*b*, 123*b*, 124*b*. Where the substrates 102, 104 comprise a plurality of segments, each segment (e.g., segments 121*a*-124*a*, 121*b*-124*b*) is hinged to an adjacent segment by a line of weakness 130 formed in the substrates 102, 104. Each line of weakness 130 is formed in substantially the same position, along a height of the shroud 120, so that the lines of weakness 130 of substrate 102 are substantially aligned with the lines of weakness 130 of substrate 104 and the segments 121-124 thereof fold as a unit. For example, the line of weakness 130 joining segment 121*a* of substrate 102 is vertically aligned with the line of weakness 130 joining segment 121*b* of substrate 104 so that, when substrates 102, 104 are collapsed to a substantially flat state, segments 121*a*, 121*b* fold about the respective line of weakness 130 relative to the respective underlying segment 122*a*, 122*b*. The example triangular display 100 can, thus, be collapsed, folded and stowed by performing, in part, a reverse of the operation depicted in FIG. 1 with each flattened segment being rotated about a line of weakness 130 of an adjoining segment to permit folding of the triangular display 100.

FIG. 2 is a perspective top view of the example triangular display 100 in accordance with teachings herein, showing the example triangular display 100 in an intermediary position of deployment, following an unfolding of the folded display 100, such as is represented in FIG. 1. FIG. 2 shows the substrates 102, 104 disposed in opposition to one another and connected to one another to form the shroud 120 via the first joint 150 (e.g., connected flaps 206, 216) and the second joint 152 (e.g., connected flaps 208, 218).

FIG. 2 shows a line of weakness 140*a* formed along an axial direction of the substrate 102 (see also FIG. 1) to define, adjacent the line of weakness 140*a*, a first section 202 having a first lateral length L1 and a second section 204 having a second lateral length L2. FIG. 2 shows another line of weakness 140*b* formed along an axial direction of the substrate 104 (see also FIG. 1) to define, adjacent the line of weakness 140*b*, a first section 212 having a first lateral length L1 and a second section 214 having a second lateral length L2.

FIG. 2 shows an example polygonal former 220 disposed on an interior of the example triangular display 100. The example polygonal former 220 is shown in FIG. 2 to extend between the first section 202 of the first substrate 102 and the first section 212 of the second substrate 104. In the example of FIG. 2, the example polygonal former 220 has a line of weakness 225 formed at a central portion of the polygonal former 220, about which a proximal end of a first section 230 of the polygonal former 220 and a proximal end of a second section 240 of the polygonal former 220 are rotatably connected.

In FIG. 2, a distal end 232 of the first section 230 of the polygonal former 220 is attached to the first section 202 of the first substrate 102 and distal end 242 of the second section 240 of the polygonal former 220 is attached to the first section 212 of the second substrate 104. In the position shown in FIG. 2, the polygonal former 220 is disposed in a semi-folded position as the triangular display 100 transitions from the folded position to a deployed position. In this position, in the example depicted, the central portion of the polygonal former 220 is positioned higher than the distal portions 232, 242 of the first section 230 and second section 240. In some examples, the polygonal former 220 is disposed to extend between the first and second sections 202, 212 of the first and second substrates 102, 104 such that the orientation of the polygonal former 220 is in a reverse orientation (upside-down) relative to the orientation shown in FIG. 2. In some examples, where a plurality of polygonal formers 220 are disposed in different segments of a multi-segment triangular display 100, the polygonal formers 220 may be disposed in a same direction, wherein they are all oriented similarly within the shroud, or in different directions. For example, a first polygonal former 220 is disposed between segments 121*a*, 121*b*, and a second polygonal former 220 is disposed between segments 124*a*, 124*b*. In this example, the polygonal former 220 disposed between segments 121*a*, 121*b* is oriented to fold in a first direction where the center of the polygonal former 220 is higher than the distal portions 232, 242 upon folding, so that, upon deployment, the center of the polygonal former 220 moves downwardly toward the second joint 152. In this example, the polygonal former 220 disposed between segments 124*a*, 124*b* may be oriented to fold in a second direction where the center of the polygonal former 220 is lower than the distal portions 232, 242 upon folding, so that, upon deployment, the center of the polygonal former 220 moves upwardly toward the second joint 152. Alternatively, in this same example, the polygonal former 220 disposed between segments 124*a*, 124*b* may be oriented to fold in the first direction where the center of the polygonal former 220 is higher than the distal portions 232, 242 upon folding, so that, upon deployment, the center of the polygonal former 220 also moves downwardly toward the second joint 152.

In a folded position or a partially-folded position of the example polygonal former 220, a center point of the middle of the example polygonal former 220 (e.g., along the line of weakness 225) is offset from center points of the distal portions 232, 242 of the first section 230 and second section 240 in a direction closer to joint 150 when the example polygonal former 220 is in a non-planar orientation. As the example polygonal former 220 moves from the stowed or folded position to a deployed position (FIG. 9), a center portion of the example polygonal former 220 follows an angled path toward the second joint 152. When the example polygonal former 220 attains a planar orientation, the center point of the middle of the example polygonal former 220 is substantially aligned to the center points of the distal portions 232, 242 of the first section 230 and second section 240.

In the illustrated example of FIG. 2, the example polygonal former 220 is trapezoidal and includes a first side or a base 250 and a second side or a base 255, the first base 250 having a first length and the second base 255 having a second length shorter than the first length. The example line of weakness 225 is formed at a central portion of the example polygonal former 220 along a line from a center of the first base 250 to a center of the second base 255, which aligns along a direction between the first joint 150 and the second joint 152.

The example trapezoidal polygonal former 220 of FIG. 2 is shown to have, a first lateral edge defined by a line of weakness 260 formed at the distal portion 232 of the first section 230 and a second lateral edge defined by a line of weakness 265 formed at the distal portion 242 of the second section 240. Depending from the distal portion 232 of the first section 230 is a flap 270 (see, e.g., FIG. 8) rotatable coupled to the distal portion 232 via the line of weakness 260. Depending from the distal portion 242 of the second section 240 is a flap 275 (see, e.g., FIG. 8) rotatable coupled to the distal portion 242 via the line of weakness 265.

As noted above, the distal portion 232 of the first section 230 of the polygonal former 220 is attached to the first section 202 of the first substrate 102 and the distal portion 242 of the second section 240 of the polygonal former 220 is attached to the first section 212 of the second substrate 104. In some examples, such as in the example trapezoidal polygonal former 220 of FIG. 2, this attachment of the polygonal former 220 to the substrates 102, 104 is achieved via use of the flaps 270, 275 depending from the distal portions 232, 242 of the first and second sections 230, 240, respectively. In some examples, the flaps 270, 275 are rotated upwardly (or downwardly) about the respective line of weakness 260, 265 so as to present an exterior surface of the flap to matingly engage a corresponding portion of the substrates 102, 104, to which the flaps 270, 275 may be coupled (e.g., via adhesives, snap connectors, clips, hook-and-eye fasteners, hook-and-loop fasteners, pins, staples, adhesives, thermal bonding, female attachment feature to receive the flap, etc.).

The polygonal former 220 of FIG. 2 is also shown to include an example notch 280 and an example attachment feature 290. The example notch 280 may include a rectangular notch, a triangular notch, or other notch geometry to enable sufficient overlap between the polygonal former 220 and the second joint 152 to allow the second section 204 of the first substrate 102 and the second section 214 of the second substrate 104 to lie substantially adjacent the base 250 of the polygonal former 220 in a deployed position of the triangular display 100. In the example notch 280 shown in FIG. 2, the notch geometry includes, as an entry point for the second joint 152, a wider first portion (e.g., a chamfered portion) to provide additional tolerances and clearance to ease assembly of the parts, and a narrower second portion (e.g., rectangular in shape) to receive a distal end of the second joint 152. In some examples, the example attachment feature 290 is omitted and, instead, at least a portion of the notch 280 is dimensioned to engage the second joint 152 as a press fit or frictional connection. In some examples, to facilitate a press fit connection between the notch 280 and the second joint 152, the notch 280 and/or the second joint 152 is provided with an insert (e.g., plastic, etc.) or high friction material or coating to facilitate engagement.

The example attachment feature 290 includes, in the example shown in FIG. 2, a female attachment feature dimensioned to cooperatively engage an attachment feature (not shown in FIG. 2; see FIGS. 5-7) of the second joint 152. In the depicted example, the example attachment feature 290, a female attachment feature, includes an opening formed in an interior portion of the polygonal former 220 along a center line defined by line of weakness 225 dimensioned to cooperatively engage a male attachment feature (see, e.g., FIGS. 5-7) of the second joint 152 including a projecting member projecting therefrom. While the example polygonal former 220 is shown to include a female attachment feature 290 to engage a male attachment member of the second joint 152, the polygonal former 220 may alternatively include, as attachment feature 290, a male attachment feature configured to engage a female attachment member of the second joint 152 (e.g., a tie-down member on the polygonal former 220 configured to pass through an opening in the second joint to tie the polygonal former 220 to the second joint, etc.). Yet further, in some examples, a plurality of cooperating male/female attachment features may be provided on any combination of the polygonal former 220, second joint 152, second section 204 of the first substrate 102 and/or second section 214 of the second substrate 104 to connect the polygonal former 220, second joint 152, second section 204 of the first substrate 102 and second section 214 of the second substrate 104.

Figure 3:
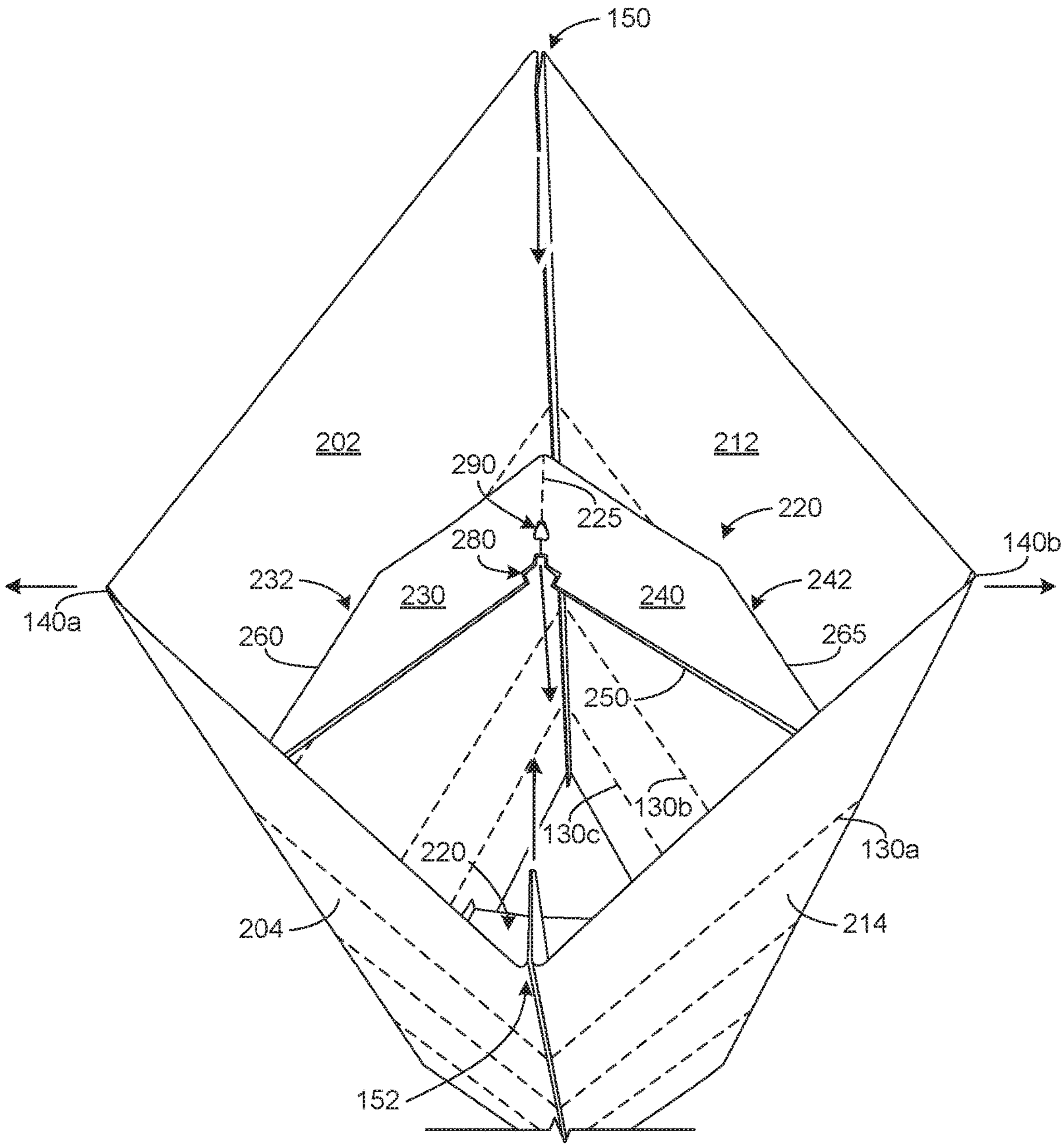
FIG. 3 is a perspective top view of the example triangular display of FIG. 1 showing further movement of the example triangular display from the intermediary position shown in FIG. 2 in a direction toward a deployed state in accordance with teachings herein.

FIG. 3 is a perspective top view of the example triangular display 100 showing, via arrows, directions of movement of the constituent parts of the example triangular display 100 as the example triangular display 100 is moved further toward a deployed state from the positions shown in FIG. 2. In particular, as compared to FIG. 2, the joints 150, 152 are closer together and the lines of weakness **140*a*, 140*b* of the substrates 102, 104 are further apart. The central portion of the example polygonal former 220 is further translated downwardly (e.g., increasing an angle between the first section 230 and second section 240 about the line of weakness 225) and aft (e.g., toward second joint 152), as compared to the position of the example polygonal former 220 in FIG. 2**.

Figure 4:
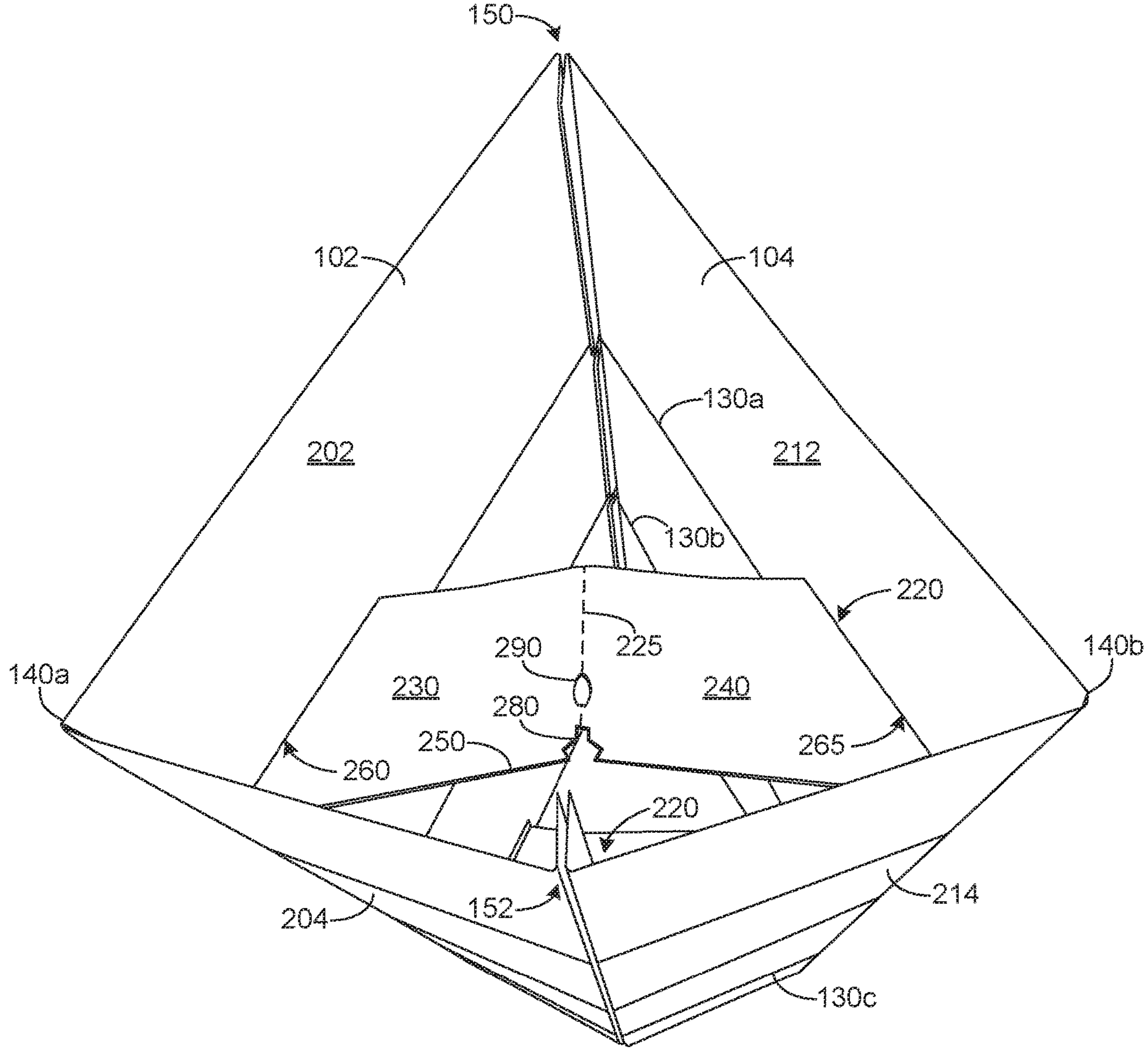
FIG. 4 is a perspective top view of the example triangular display of FIG. 1, showing further movement of the example triangular display from the intermediary position shown in FIG. 3 in a direction toward a deployed state in accordance with teachings herein.

FIG. 4 is a perspective top view of the example triangular display 100, showing yet another intermediate position of the example triangular display 100 as the example triangular display 100 is moved further toward a deployed state from the state shown in FIG. 3. In particular, as compared to FIG. 3, the joints 150, 152 are closer together and the lines of weakness **140*a*, 140*b* of the substrates 102, 104 are further apart. The central portion of the example polygonal former 220 is further translated downwardly (e.g., increasing an angle between the first section 230 and second section 240 about the line of weakness 225) and aft (e.g., toward second joint 152), as compared to the position of the example polygonal former 220 in FIG. 3. The second section 204 of the first substrate 102 and the second section 214 of the second substrate 104 are further rotated about the respective lines of weakness 140*a*, 140*b* to place the second lateral sections 204, 214 adjacent to a base 250 of the polygonal former 220**.

Figure 5:
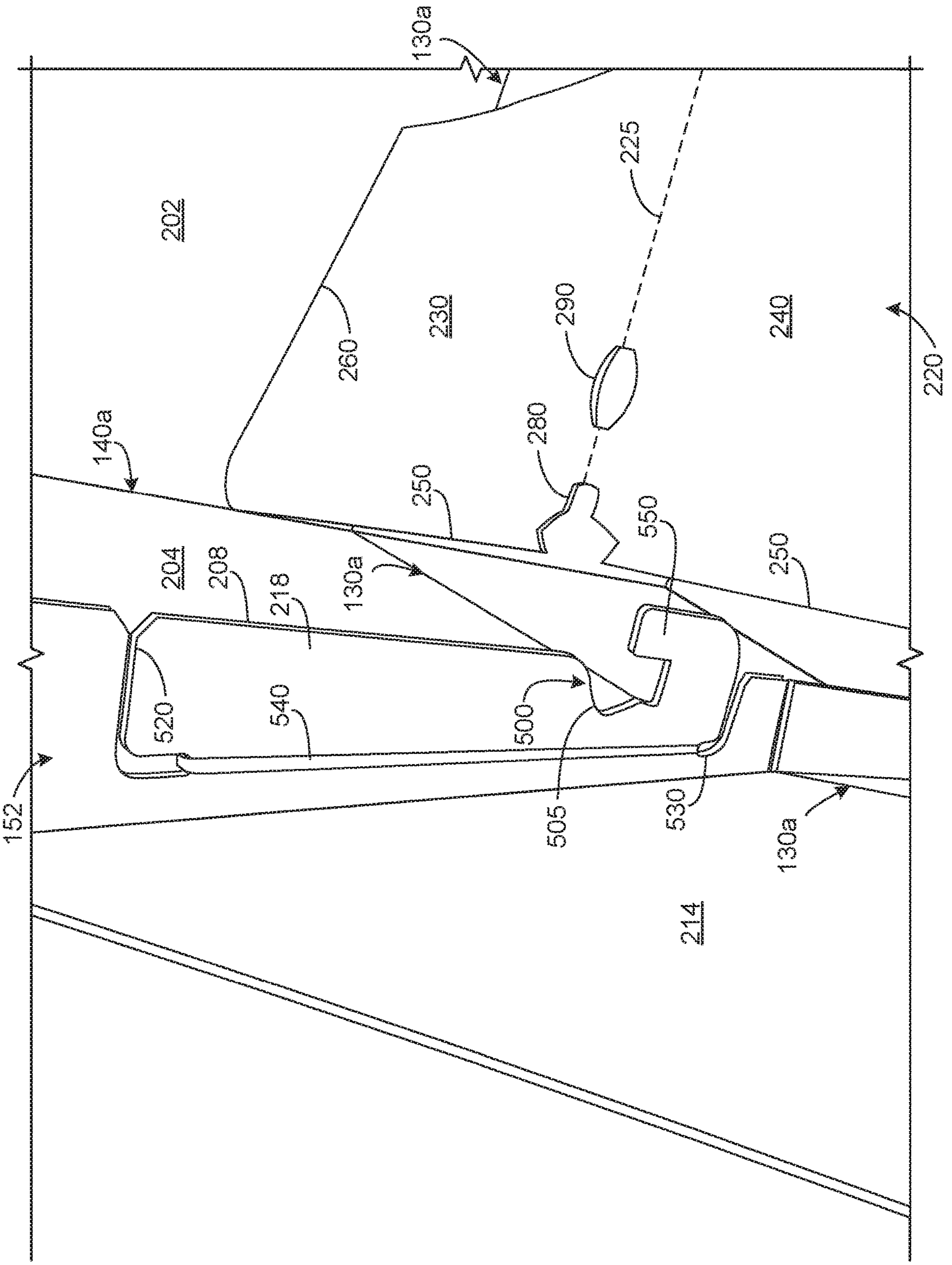
FIG. 5 is an enlarged view of a portion of the example triangular display of FIG. 1 in the intermediary position of FIG. 4 showing an example female attachment feature of an example polygonal former and an example male attachment feature in accordance with teachings herein.

FIG. 5 is an enlarged view of a portion of the example triangular display of FIG. 1 in the intermediary position of FIG. 4. From the vantage of FIG. 5, a relation between the second joint 152 and the polygonal former 220 is shown in this intermediary position near a full deployment position. In this position, the second section 204 of the first substrate 102 and the second section 214 of the second substrate 104 are approaching the polygonal former 220 and the polygonal former 220 is, likewise, approaching the second section 204 of the first substrate 102 and the second section 214 of the second substrate 104. As noted above, the example polygonal former 220 includes an example notch 280 to receive at least a portion of the second joint 152 to permit a substantially flush engagement between the base 250 of the polygonal former 220, the second section 204 of the first substrate 102 and the second section 214 of the second substrate 104.

In FIG. 5, the example second joint 152 is shown to include an example notch 500 formed to receive and cooperatively engage with the example notch 280 formed in the example polygonal former 220. In some examples, the example notch 500 includes an angled portion 505 along a line of travel of the example polygonal former 220. As noted above, the central portion of the example polygonal former 220 moves both laterally and downwardly toward the second joint 152, yielded an angled approach vector. For the example polygonal former 220 depicted in FIG. 5, which has a central portion moving downwardly toward the example notch 500, the example angled portion 505 is angled upwardly. Conversely, if an example polygonal former 220 is positioned such that a central portion moves upwardly toward the example notch 500 (e.g., positioned "upside-down" relative to the orientation of the polygonal former 220 shown in FIG. 5, such as at a bottom segment 124*a*, 124*b* of a triangular display 100), the example angled portion 505 would be angled downwardly.

FIG. 5 also shows that the flaps 208, 218 include features such as the example grooves 520 and the example grooves 530 that facilitate connection of the flaps 208, 218 to form the second joint 152. These features are also correspondingly provided in the flaps 206, 208 (not shown in FIG. 5) to facilitate connection of the flaps 206, 208 to form the first joint 150. Each set of example grooves 520, 530 (e.g., in corresponding flaps 206, 208 or 216, 218) in opposing substrates 102, 104 retains an example elastic member 540 that is used to connect example substrates 102, 104 together. For example, when substrate 104 is assembled together with substrate 102, the elastic member 540 is disposed about both the groove 520 and the groove 530 to connect the substrates at that portion of the triangular display 100.

In some examples, the flaps 206, 208, 216, 218 in each segment 121*a*-124*b* (see FIG. 1) of the triangular display 100 include similarly configured pairs of grooves 520, 530. Assembly of the substrates 102, 104 includes connecting an elastic member 540 about the groove pairs 520, 530 to connect the substrates 102, 104, segment by segment (e.g., from a bottom segment 124*a*, 124*b* to a top segment 121*a*, 121*b*, etc.), along each joint 150, 152 of the triangular display 100 until the joints 150, 152 are completed. In some examples, a bottom segment 124*a*, 124*b* includes additional grooves in the joints 150, 152 (not shown) to provide fixation points to which attachment members (e.g., elastic members, etc.) of a stand may be affixed.

Figure 6:
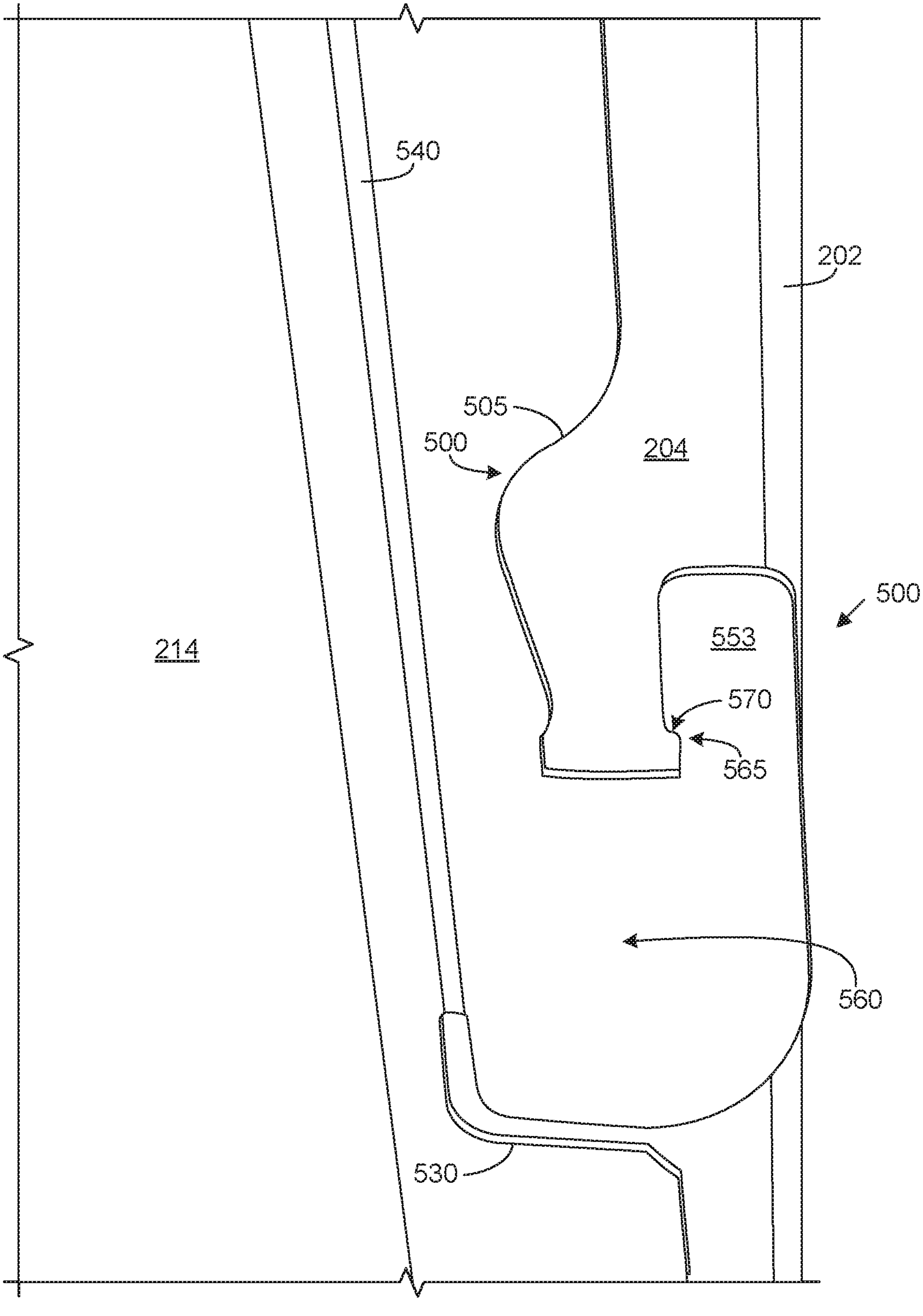
FIG. 6 is a perspective side view of the example male attachment feature of FIG. 5 in accordance with teachings herein.
Figure 7:
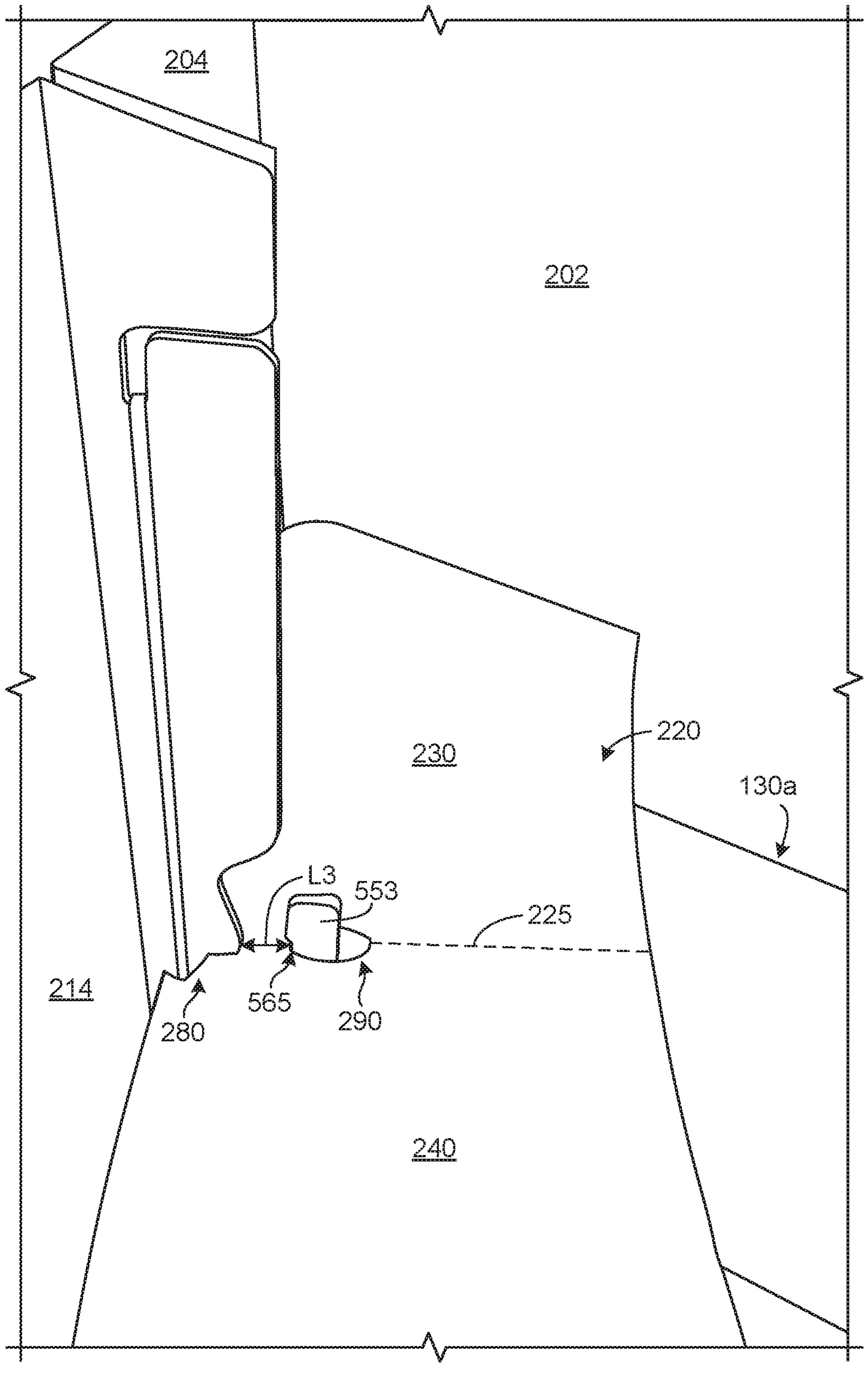
FIG. 7 is a perspective top view of the example triangular display in a deployed state wherein the example male attachment feature of FIG. 6 is connected to the example female attachment feature of FIG. 5 in accordance with teachings herein.

FIG. 6 shows a perspective side view of an example male attachment feature 550 for the example triangular display 100. In this example, the example male attachment feature 550 is dimensioned to cooperatively engage a corresponding female attachment feature 290 of the polygonal former 220, such as is shown in FIG. 7 and also disclosed above. The example male attachment feature 550 includes a projecting member 560 extending outwardly in a first direction (e.g., perpendicularly, at a non-perpendicular angle, etc.) from the second joint 152. The male attachment feature 550 includes a tip 553 that is disposed on the projecting member 560 to extend in a second direction different than the first direction (e.g., perpendicular to the first direction, in an axial direction of the triangular display 100, etc.). In the example shown in FIG. 6, the tip 553 of the male attachment feature 550 extends upwardly from the projecting member 560. In an example wherein the polygonal former 220 is positioned such that a central portion moves upwardly toward the example notch 500 (e.g., positioned "upside-down" relative to the orientation of the polygonal former 220 shown in FIG. 6), the tip 553 of the male attachment feature 550 would extend downwardly from the projecting member 560. In the deployed position of the display 100, the tip 553 slidably engages the female attachment feature 290.

FIG. 6 also shows an example locking tab 565 formed in the tip 553 and/or the projecting member 560. The example locking tab 565 is dimensioned to accept and retain a thickness of the polygonal former 220 with a ledge portion 570 preventing the polygonal former 220 from moving vertically up and over the tip 553 of the male attachment feature 550. Instead, in the illustrated example, disengagement of the female attachment feature 290 of the polygonal former 220 from the male attachment feature 550 requires a slight bias to be applied to slightly displace the polygonal former 220 in a direction of the second joint 152, following which the polygonal former 220 may be vertically moved out of the notch 500 by folding the polygonal former 220 about the line of weakness 225.

Figure 9:
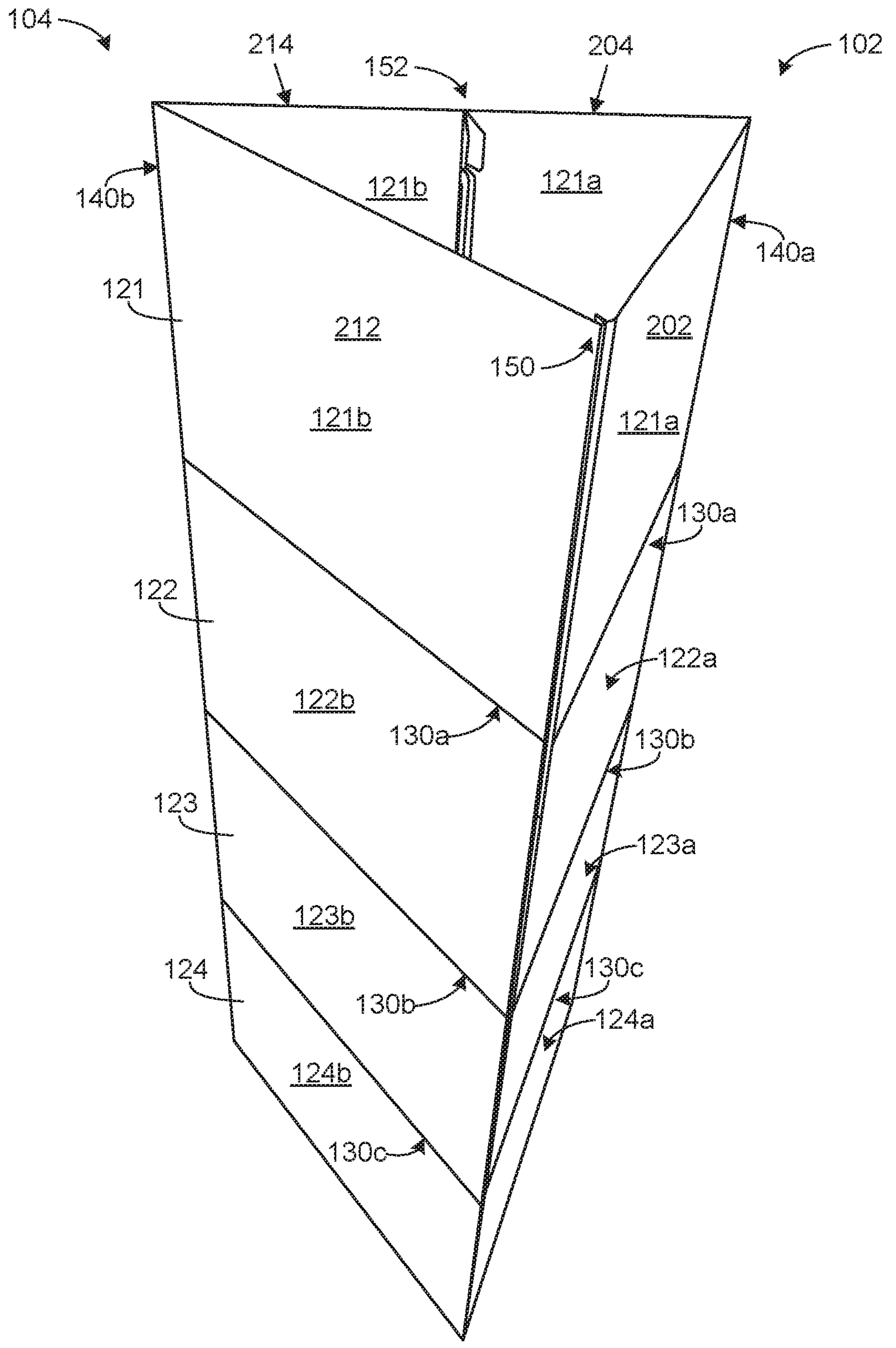
FIG. 9 is a perspective side view of the example triangular display of FIG. 1 in a deployed state showing the triangular configuration of the example triangular display in accordance with teachings herein.

FIG. 7 shows an example polygonal former 220 positioned in the example triangular display 100 in a deployed state (see also FIG. 9). In this state, the male attachment feature 550 and the tip 553, in particular, is fully disposed within female attachment feature 290 of the polygonal former 220 and the notch 280 of the polygonal former 220 is fully seated in the notch 500 of the second joint 152. Further, in this example, the example locking tab 565 engages a portion of the polygonal former 220 adjacent the female attachment feature (opening) 290 to help retain the polygonal former 220 in place. As is shown in FIG. 7, a length L3 between the notch 280 and the female attachment feature 290 is less than a lateral depth of the notch 500, permitting this portion of the polygonal former 220 to be received within the notch 500. In the deployed state represented in FIG. 7, the polygonal former 220 is shown to be substantially planar.

Figure 8:
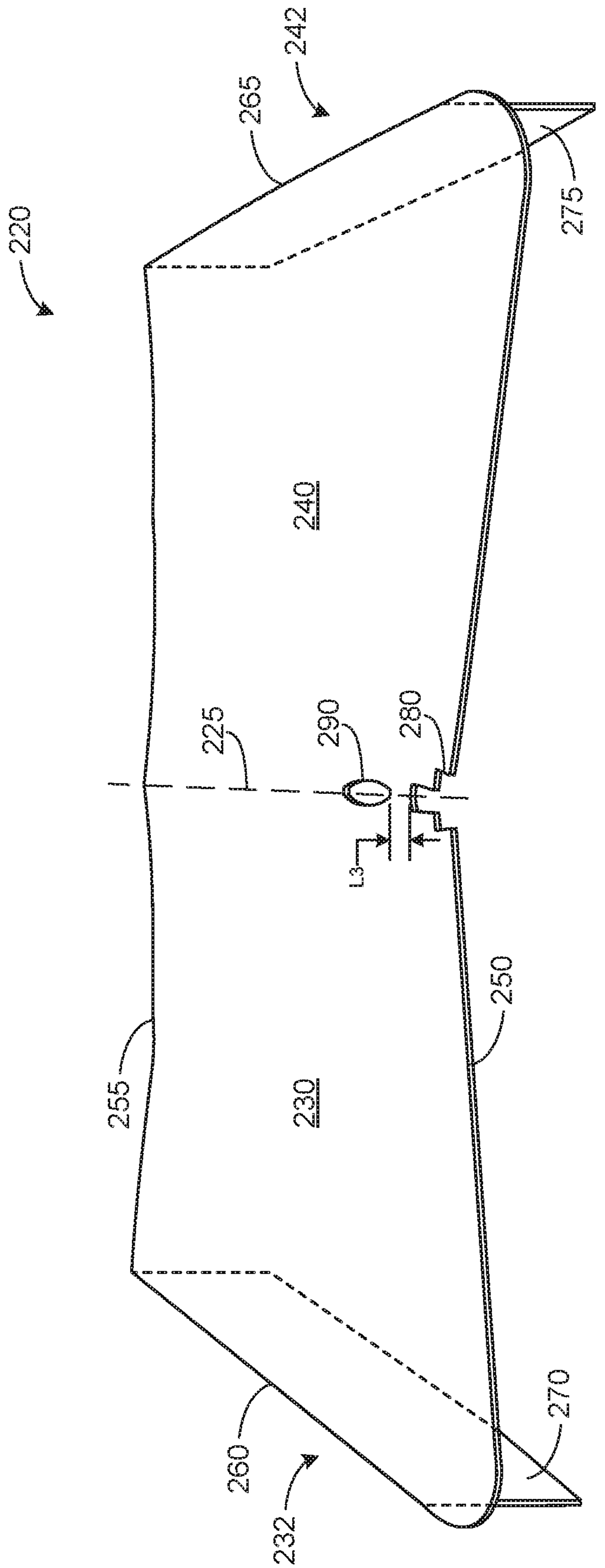
FIG. 8 is a top perspective view of the example polygonal former of FIG. 5 in accordance with teachings herein.

FIG. 8 is a top view of the example polygonal former 220 of the example triangular display 100 illustrated in FIGS. 2-7. The example polygonal former 220 is shown, in this example, to be a trapezoid having a first lateral edge (a first leg) at the line of weakness 260, a second lateral edge (a second leg) at the line of weakness 265, the first base 250 and the second base 255. FIG. 8 shows line of weakness 225, formed at a central portion of the polygonal former 220, defining the first section 230 and second section 240 of the polygonal former 220 which are rotatable about the axis defined by the line of weakness 225. The distal end 232 of the first section 230 includes the line of weakness 260 to which the flap 270 is rotatably coupled. The distal end 242 of the second section 240 includes the line of weakness 265 to which the flap 275 is rotatably coupled. As noted above, in some examples, the example polygonal former 220 is connected to the substrates 102, 104 via the flaps 270, 275. In some examples, exterior surfaces of the flaps 270, 275 are adhesively connected to the interior surfaces of the substrates 102, 104. In some examples, the flaps 270, 275 are passed through openings formed in the substrates 102, 104 and connected to exterior surfaces of the substrates 102, 104.

In the example of FIG. 8, formed along the line of weakness 225 or centerline of the polygonal former 220, from a center portion of the first base 250 to a center portion of the second base 255, are the notch 280 and the female attachment feature 290. Between the notch 280 and the female attachment feature 290 is a segment having a length L3 dimensioned to fit in a space defined between the notch 500 and the tip 553 of the male attachment feature 550 of the second joint 152.

FIG. 9 is a perspective side view of the example four-segment triangular display 100 in a deployed state. As shown, the first section 202 of the substrate 102 and the first section 212 of the substrate 104 are joined together at the first joint 150 in the foreground. In the background, the second section 204 of the substrate 102 and the second section 214 of the substrate 104 have been rotated about lines of weakness 140*a*, 140*b* and joined together at the second joint 152. In some examples, exterior surfaces of the substrates 102, 104 are provided with text, images, signs or advertisements.

To stow the example triangular display 100, the assembly procedure of FIGS. 2-7 is reversed. First the polygonal formers 200 are disengaged from their attachment to the second joint 152 by biasing the polygonal formers 200 slightly toward the second joint 152 to disengage the tab 565 from the polygonal formers 220 and permit the polygonal formers 220 to be moved out of the notch 500. Then, the shroud 120 may be collapsed to a substantially planar state by pressing on the sides of the triangular display 100 along center portions of the faces of the substrates 102, 104 (e.g., left-to-right inward force applied to the left substrate 102 in FIG. 2 and right-to-left inward force applied to right substrate 104 in FIG. 2, etc.), which forces the first joint 150 and the second joint 152 away from one another, forces the first section 202 and second section 204 of substrate 102 to rotate relative to the line of weakness 140*a* toward a planar state, and forces the first section 212 and second section 214 of substrate 104 to rotate relative to the line of weakness 140*b* toward a planar state. Once the substrates 102, 104 are substantially planar, the segments 121*a*, 121*b*, 122*a*, 122*b*, 123*a*, 123*b*, 124*a*, and 124*b* may then be rotated about the transverse lines of weakness 130*a-c* to fold the segments 121*a*-124*b* on top of one another.

Figure 10:
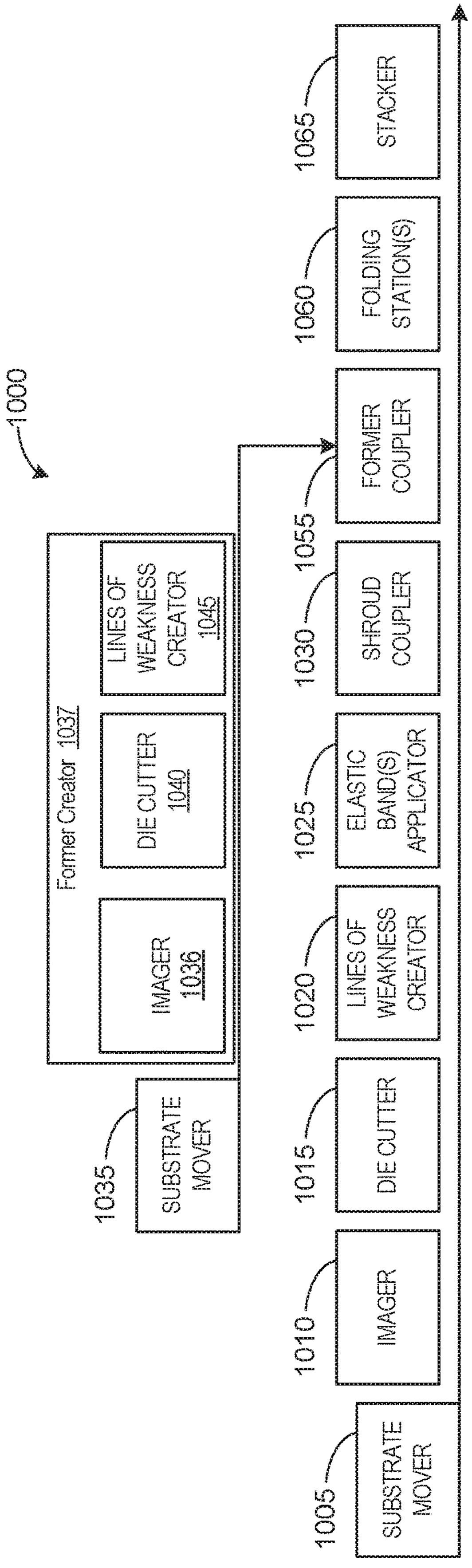
FIG. 10 illustrates an example apparatus that can be used to produce the example triangular displays disclosed herein.

FIG. 10 represents an example apparatus 1000 that can be used to produce the example triangular displays 100 disclosed herein. In some examples, the apparatus 1000 performs an in-line process that includes processes to produce the example shroud 120 in accordance with the teachings of this disclosure, example processes to produce the example polygonal former 220 in accordance with the teachings of this disclosure and processes to produce the example triangular display 100 in accordance with the teachings herein. While the processes disclosed below are described in connection with automatic processes, any and/or all of the processes disclosed may instead be implemented manually.

In the illustrated example, the example apparatus 1000 includes elements to produce the example shroud 120 and/or the example triangular display 100, including, for example, a substrate mover 1005, an imager 1010, a die cutter 1015, a lines of weakness creator 1020, an elastic band applicator 1025, a shroud coupler 1030, an imager 1036, a former coupler 1055, a folding station 1060, and a stacker 1065. Feeding into the polygonal former coupler 1055 is an output, one or more polygonal formers 220 formed via a second substrate mover 1035 and a former creator 1037 including a die cutter 1040 and a lines of weakness creator 1045.

To produce the example shroud 120 in accordance with the teachings of this disclosure, in some examples, the substrate mover 1005 feeds one or more pieces of substrate and/or a web of substrate into the apparatus 1000.

In some examples, the imager 1010 images a first and/or a second side of the example shroud blank(s) and/or substrate(s) (e.g., 102, 104). The images may include brand-related images and/or text, advertising-related images and/or text, point-of-purchase-related images and/or text, instructional images and/or text, and/or any other desired indicia.

The die cutter 1015 forms one or more features and/or notches within the shroud and/or elongate substrates 102, 104, including, for example, grooves and/or notches (e.g., 520, 530) on flaps (e.g., 206, 208, 216, 218) of the substrates 102, 104. In some examples, the die cutter 1015 forms elongate substrates 102, 104 from continuous stock.

The lines weakness creator 1020 forms one or more lines weakness on the first and/or second sides of the shroud blank and/or the elongate substrates 102, 104 using one or more die(s), one or more cutting tool(s), one or more scoring tool(s), or one or more slotting tool(s). For example, the lines of weakness creator 1020 may form the axial lines of weakness 140*a*, 140*b* (see, e.g., FIG. 1) defining the first and second sections 202, 204, 212, 214 of the substrates 102, 104. The lines of weakness creator 1020 may also form the axial lines of weakness 141-144 (see, e.g., FIG. 2) defining the first and second flaps 206, 208 of the first substrate 102 and the first and second flaps 216, 218 of the second substrate 104. The lines of weakness creator 1020 may also form the lateral axial lines of weakness 130*a*-130*c* (see, e.g., FIG. 1, FIG. 9) defining the four segments 121*a*, 122*a*, 123*a*, and 124*a* of the first substrate 102 and defining the four segments 121*b*, 122*b*, 123*b*, 124*b* of the second substrate 104.

An example elastic band applicator 1025 couples one or more elastic bands 540 to, or adjacent to, one or more flaps 206, 208, 216, 218 of the substrates 102, 104. In some examples, the elastic band applicator 1025 couples one or more elastic bands 540 between the pairs of grooves 520, 530 of the flaps 206, 208, 216, 218.

In some examples, to produce an example polygonal former 220, the substrate mover 1035 feeds one more pieces of substrate and/or a web of substrate into the apparatus 1000. In some examples, the imager 1036 images a first and/or a second side of the example substrate and/or a web of substrate used to form the polygonal formers 220. The images may include brand-related images and/or text (or portions thereof), advertising-related images and/or text (or portions thereof), point-of-purchase-related images and/or text (or portions thereof), instructional images and/or text (or portions thereof), and/or any other desired indicia (or portions thereof). In particular, the images and/or text (or portions thereof) are imparted to any portion of the polygonal formers 220 that may be visible, such as in example displays having flaps 270, 275 of the polygonal former 220 extending through the substrates 102, 104 for securement to outer surfaces of the display. In this way, imagery and/or text (or portions thereof) on the visible surfaces of flaps 270, 275 may compliment corresponding imagery and/or text printed on the substrates 102, 104 so as to provide continuity in the substrates 102, 104 imagery and/or text printed on the substrates 102, 104.

The die cutter 1040 forms one or more polygonal formers 200 from an example web. In some examples, the die cutter 1040 forms substrates such as is represented in FIG. 8, inclusive of the notch 280 and attachment member 290. The example lines of weakness creator 1045 forms the lines of weakness (e.g., 225, 260, 265) in the polygonal former 220 substrate using one or more die(s), one or more cutting tool(s), one or more scoring tool(s) or one or more slotting tool(s).

In some examples, the shroud coupler 1030 forms the triangular display 100 shroud by folding the flaps 206, 208 of a first substrate (e.g., 102) about their respective lines weakness 141, 142 and folding the flaps 216, 218 of a second substrate (e.g., 104) about their respective lines weakness 143, 144 and by coupling respective pairs of inwardly facing and opposing flaps (e.g., 206, 208) via grooves 520, 530 using the elastic members provided by the elastic bands applicator 1025.

In some examples, the former coupler 1055 couples an example polygonal former 220 within the interior of the example shroud 120 by positioning the polygonal former 220 relative to the substrate 102 and the substrate 104 and adhesively securing ends flaps 270, 275 of the polygonal former 220 to interior portions of the substrates 102, 104. In one example, a first polygonal former 220 is adhered in a first orientation to a first segment 121*a*, 121*b* of a triangular display 100 shroud and a second polygonal former 220 is adhered in a second orientation to a fourth segment 124*a*, 124*b* of a triangular display 100 shroud.

The folding station 1060 flattens and/or folds the triangular display 100 along the longitudinal axes of the shroud 120 and/or folds the triangular display about the transverse axes of the shroud, along the line(s) of weakness 130*a-c*, for storage and/or shipping. The stacker 1065 stacks the triangular displays 100 for storage and/or shipping. In some examples, one or more of the processes implemented by the former creator 1037, the elastic band applicator 1025, the former coupler 1055, the shroud coupler 1030, the folding station 1060 and/or the stacker 1065 in FIG. 10 are performed manually.

While the stations and/or portions, including the example substrate mover 1005, the example imager 1010, the example die cutter 1015, the example lines of weakness creator 1020, the example elastic band applicator 1025, the example shroud coupler 1030, the example former coupler 1055, the example folding station 1060, the example stacker 1065, the example substrate mover 1035, the example die cutter 1040, the example lines of weakness creator 1045 and/or the example former creator 1037 of the apparatus 1000, are depicted in a particular order, the stations and/or portions, including the example substrate mover 1005, the example imager 1010, the example die cutter 1015, the example lines of weakness creator 1020, the example elastic band applicator 1025, the example shroud coupler 1030, the example former coupler 1055, the example folding station 1060, the example stacker 1065, the example substrate mover 1035, the example imager 1036, the example die cutter 1040, the example lines of weakness creator 1045 and/or the example former creator 1037 of the apparatus 1000, may be implemented in any other way.

For example, the order of the stations and/or portions including the example substrate mover 1005, the example imager 1010, the example die cutter 1015, the example lines of weakness creator 1020, the example elastic band applicator 1025, the example shroud coupler 1030, the example former coupler 1055, the example folding station 1060, the example stacker 1065, the example substrate mover 1035, the example imager 1036, the example die cutter 1040, the example lines of weakness creator 1045 and/or the example former creator 1037 of the apparatus 1000 may be changed, and/or some of the example substrate mover 1005, the example imager 1010, the example die cutter 1015, the example lines of weakness creator 1020, the example elastic band applicator 1025, the example shroud coupler 1030, the example former coupler 1055, the example folding station 1060, the example stacker 1065, the example substrate mover 1035, the example imager 1036, the example die cutter 1040, the example lines of weakness creator 1045 and/or the example former creator 1037 of the apparatus 1000 may be changed, eliminated, or combined. For example, while the apparatus 1000 is depicted as having a die cutter 1015 separate from a lines of weakness creator 1020, in some examples, the die cutter 1015 and the lines of weakness creator 1020 may be combined. Likewise, while the apparatus 1000 is depicted as having a die cutter 1040 separate from a lines of weakness creator 1045, in some examples, the die cutter 1040 and the lines of weakness creator 1045 may be combined.

Figure 11:
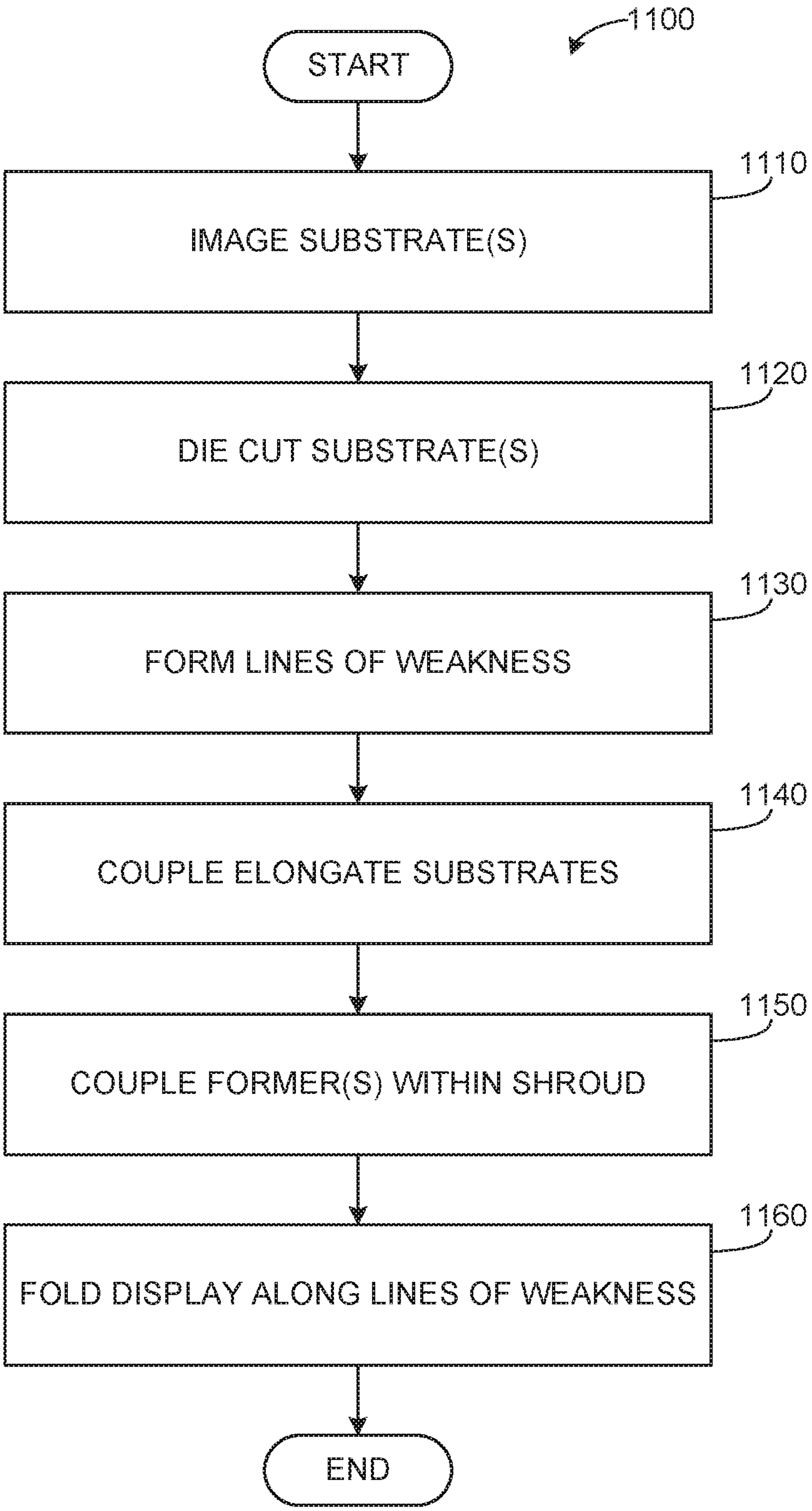
FIG. 11 illustrates a flowchart representative of machine-readable instructions that may be executed to implement the apparatus of FIG. 10.

A flowchart representative of example machine-readable instructions for implementing the apparatus of FIG. 10 is shown in FIG. 11. In this example, the machine-readable instructions comprise a program for execution by a processor such as the processor 1212, shown in the example processor platform 1200 discussed below in connection with FIG. 12. The program may be embodied in software stored on a tangible computer-readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 11, many other methods of implementing the example apparatus 1000 of FIG. 10 may alternatively be used. For example, the order of execution of the blocks may be changed, and/or some of the blocks described may be changed, eliminated, or combined.

As mentioned above, the example processes of FIG. 12 may be implemented using coded instructions (e.g., computer and/or machine-readable instructions) stored on a tangible computer-readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer-readable storage medium" is expressly defined to include any type of computer-readable storage device and/or storage disk and to exclude propagating signals and transmission media. As used herein, "tangible computer-readable storage medium" and "tangible machine-readable storage medium" are used interchangeably. Additionally or alternatively, the example processes of FIG. 12 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer-readable medium" is expressly defined to include any type of computer-readable storage device and/or storage disk and to exclude propagating signals and transmission media. As used herein, when the phrase "at least" is used as the transition term in a preamble of a claim, it is open-ended in the same manner as the term "comprising" is open-ended.

The process 1100 of FIG. 11 includes imaging a substrate (e.g., the elongated substrates) (block 1110) using, for example, the imager 1010 that images a first and/or second side of the elongated substrate(s) 102, 104 and/or a first and/or a second side of a substrate from which the substrates 102, 104 are to be formed. The imaging may include, for example, brand-related images and/or text, advertising-related images and/or text, point-of-purchase-related images and/or text, instructional images and/or other text, indicia and/or images. Block 1100 may further include imaging of the substrate used to form the polygonal former 220 and, in particular, surfaces of the polygonal former 220 that may be visible outside of the display. The imaging on the polygonal former 220, or a portion thereof, such as flaps 270, 275, may include brand-related images and/or text (or portions thereof), advertising-related images and/or text (or portions thereof), point-of-purchase-related images and/or text (or portions thereof), instructional images and/or text (or portions thereof), and/or any other desired indicia (or portions thereof). Imagery and/or text (or portions thereof) printed on the polygonal former 220, or portions thereof, may advantageously compliment corresponding imagery and/or text printed on the substrates 102, 104 so as to provide continuity in the substrates 102, 104 imagery and/or text printed on the substrates 102, 104.

The substrates are die cut (block 1120) using, for example, the first die cutter 1015 to form the substrates 102, 104 and to form features in the substrates 102, 104, such as, but not limited to, the flaps 206, 208, 216, 218 or grooves 520, 530. In some examples, block 1120 includes using the second die cutter 1040 to form the polygonal former 220 and to form features in the polygonal former 220 such as, but not limited to, the notch 280 and attachment feature 290.

In block 1130, lines of weakness (e.g., 130*a*-130*c* and 140*a*-140*b* in FIG. 1, 141-144 in FIG. 2, etc.) are formed in the substrate(s) (e.g., substrates 102, 104) and/or the polygonal former 220 (e.g., 225, 260, 265) using, for example, the first lines of weakness creator 1020 and/or second lines of weakness creator 1045 via one or more die(s), one or more cutting tool(s), one or more scoring tool(s) or one or more slotting tool(s).

In block 1140, the elongate substrates 102, 104 are coupled. In some examples, the elongate substrates 102, 104 are folded about the lines of weakness 141-144 to form the inwardly facing flaps 206, 208 (substrate 102) and flaps 216, 218 (substrate 104) and an elastic band applicator 1025 applies elastic bands 540 to couple the adjacent and opposing flaps (e.g., 206, 216 and 208, 218) of the substrates 102, 104 to define the shroud. In some examples, the elongate substrates 102, 104 are coupled via an adhesive or physical attachment members (e.g., staples, etc.). In some examples, the shroud coupler 1030 is used to couple two elongate substrates together (e.g., 102, 104 in FIG. 2). In some examples, the shroud coupler 1030 couples side edges of a single substrate together, with an additional line of weakness formed in lieu of the first joint 150.

In block 1150, one or more example polygonal formers 220 are coupled within the shroud defined by the elongate substrates 102, 104 in block 1140 using, for example, the former coupler 1055 to couple polygonal formers 220 within the interior of the shroud, such as via an adhesive connection, thus completing the formation of the example triangular display 100.

In block 1160, the formed triangular display 100 is folded along lines of weakness (e.g., lines of weakness 130*a*-*c* in substrates 102, 104) using, for example, the folding station 1060 that flattens and/or folds the triangular display 100 about transverse axes of the shroud, such as along lines of weakness 130*a*-*c*, for storage and/or shipping. The folded triangular displays 100 are stacked in block 1170 using, for example, the stacker 1065 that stacks triangular displays 100 for storage and/or shipping, etc.

Figure 12:
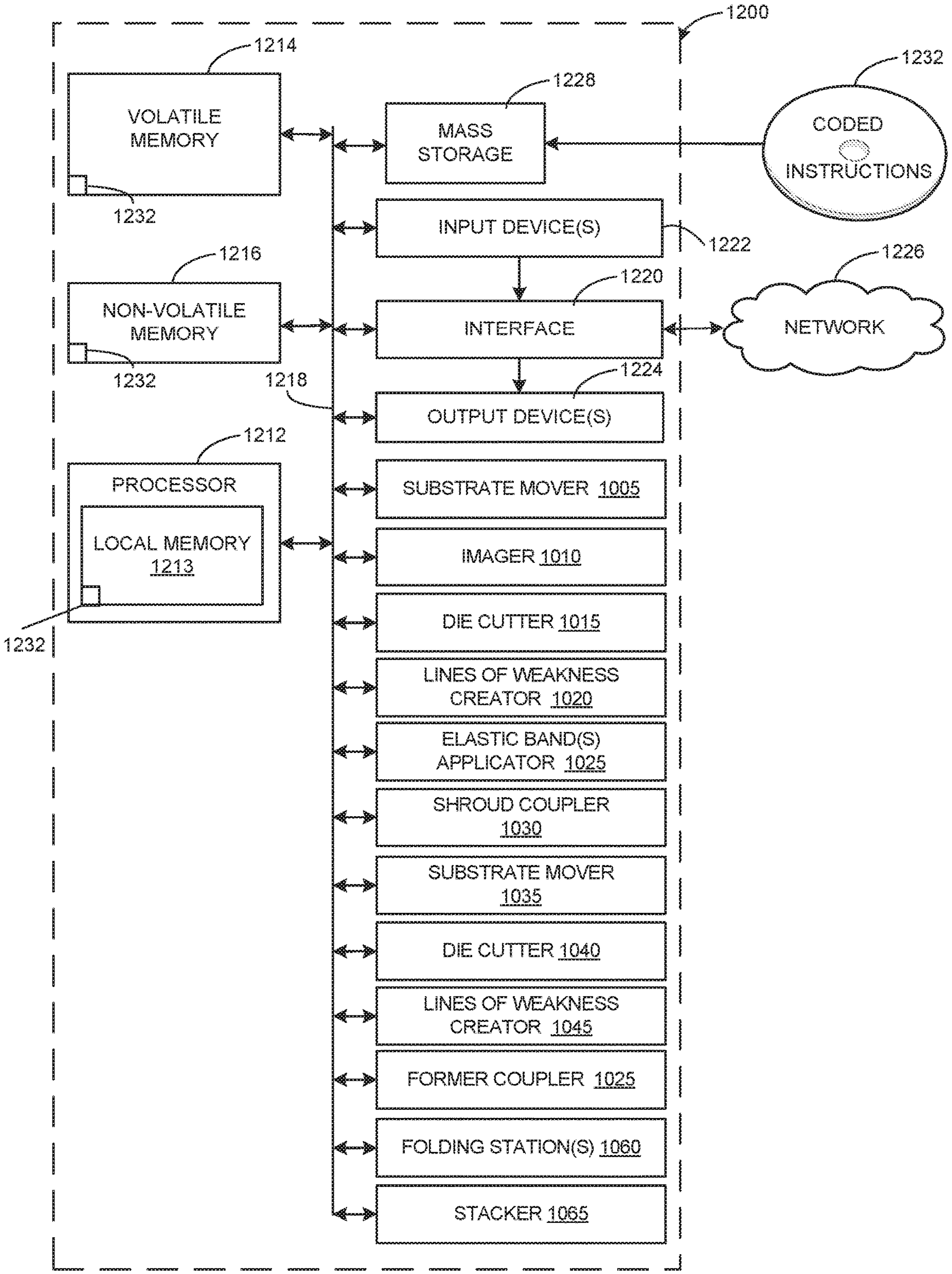
FIG. 12 illustrates a processor platform to execute the instructions of FIG. 11 to implement the apparatus of FIG. 10.

FIG. 12 is a block diagram of an example processor platform 1200 capable of executing the instructions of FIG. 11 to implement the apparatus 1000 of FIG. 10 to control operation of one or more of the example first substrate mover 1005, the example imager 1010, the example first die cutter 1015, the example first lines weakness creator 1020, the example elastic band applicator 1025, the example former coupler 1030, the example shroud coupler 1055, the example folding station 1060, the example stacker 1065, the example polygonal former coupler 1030, the example second substrate mover 1035, the example second die cutter 1040, the example second lines of weakness creator 1045 and/or the example former creator 1037. The processor platform 1200 can be, for example, a server, a personal computer, a mobile device (e.g., a tablet such as an iPad™), an Internet appliance or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device (s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIG. 12 may be stored in the mass storage device 1228, in the volatile memory 1214, in the non-volatile memory 1216, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

In Example 1, a triangular display includes a first substrate, a second substrate coupled to and disposed in opposition to the first substrate, a first line of weakness formed along an axial direction of the first substrate to define a first section and a second section, a second line of weakness formed along an axial direction of the second substrate to define a third section and a fourth section and a former having a first side, the former extending between the first section and the third section, and in a deployed position, at least one of the first section or the second section has rotated about the first line of weakness and at least one of the third section or the fourth section has rotated about the second line of weakness to place the second section and the fourth section adjacent to the first side of the former.

In Example 2, further to the triangular display according to Example 1, the first substrate and the second substrate are connected at a first side by a first joint formed from a first flap of the first substrate and a second flap of the second substrate and are connected at a second side by a second joint formed from a third flap of the first substrate and a fourth flap of the second substrate.

In Example 3, further to the triangular display according to Example 2, the third flap is coupled to the second section and the fourth flap is coupled to the fourth section.

In Example 4, further to the triangular display according to Example 1, the first section has a greater length than the second section, and the third section has a length greater than the fourth section, In Example 5, further to the triangular display according to Example 1, the former is a polygon.

In Example 6, further to the triangular display according to Example 5, the polygon is a trapezoid, and the former includes a first lateral edge, a second lateral edge, a first base and a second base, the first base having a first length and the second base having a second length shorter than the first length.

In Example 7, further to the triangular display according to Example 6, the first lateral edge is attached to the first section and the second lateral edge is attached to the third section.

In Example 8, further to the triangular display according to Example 6, a third line of weakness is formed in a middle portion of the former between the first base and the second base and, in a stowage position, the former is folded about the third line of weakness to dispose the former in a substantially flat position.

In Example 9, further to the triangular display according to Example 7, the first lateral edge of the former is rotatably connected, via a fourth line of weakness, to a first flap and the second lateral edge of the former is rotatably connected, via a fifth line of weakness, to a second flap.

In Example 10, further to the triangular display according to Example 9, the first flap is adhered to the first section, and the second flap is adhered to the third section.

In Example 11, further to the triangular display according to Example 6, the second section spans a first half of the first length of the first base, and the fourth section spans a second half of the first length of the first base.

In Example 12, further to the triangular display according to Example 2, the former includes a first attachment feature and the second joint includes a second attachment feature to attach to the first attachment feature.

In Example 13, further to the triangular display according to Example 12, the first attachment feature includes a female attachment feature and the second attachment feature includes a male attachment feature dimensioned to cooperatively engage the female attachment feature.

In Example 14, further to the triangular display according to Example 13, the female attachment feature includes an opening formed in an interior portion of the former and the male attachment feature includes a projecting member projecting from the second joint.

In Example 15, further to the triangular display according to Example 2, the former includes a first notch formed in a portion of the former adjacent the second joint to receive a portion of the second joint.

In Example 16, further to the triangular display according to Example 15, the second joint includes a second notch formed to receive and engage with the first notch.

In Example 17, further to the triangular display according to Example 14, the projecting member includes a first portion extending in a first direction and a second portion extending in a second direction, the second direction being the axial direction.

In Example 18, further to the triangular display according to Example 17, the second portion of the projecting member includes a locking tab.

In Example 19, a method of forming a triangular display includes disposing a first substrate adjacent to a second substrate, the first substrate having a first lateral edge and a second lateral edge, a first flap formed at the first lateral edge, a second flap formed at the second lateral edge, and the second substrate having a third lateral edge and a fourth lateral edge, a third flap formed at the third lateral edge and a fourth flap formed at the fourth lateral edge, connecting the first flap to the third flap to form a first joint, connecting the second flap to the fourth flap to form a second joint and disposing a former to extend between the first substrate and the second substrate, the former having a first line of weakness formed in a middle portion thereof along a direction between the first joint and the second joint, wherein the triangular display is movable between a first position, corresponding to a stowed state in which the former is folded about the first line of weakness to dispose the former in a substantially flat position, and second position, corresponding to an erected state in which the former is substantially planar.

In Example 20, further to the method of forming the triangular display according to Example 19, the method includes moving the triangular display from the first position to the second position by moving the first joint toward the second joint.

In Example 21, further to the method of forming the triangular display according to Example 20, the method includes rotating a portion of the first substrate about a second line of weakness formed along an axial direction of the first substrate to dispose a first lateral length of the first substrate adjacent a first portion of the former and rotating a portion of the second substrate about a third line of weakness formed along an axial direction of the second substrate to dispose a second lateral length of the second substrate adjacent a first portion of the former.

In Example 22, further to the method of forming the triangular display according to Example 19, the method includes connecting the second joint to the former.

In Example 23, further to the method of forming the triangular display according to Example 22, the connecting of the second joint to the former includes connecting a male attachment feature of the second joint to a female attachment feature of the former.

In Example 24, further to the method of forming the triangular display according to Example 22, the method includes disconnecting the second joint and the former and stowing the triangular display by moving the first joint away from the second joint until the first substrate and the second substrate are substantially flat.

What is claimed is:

1. A triangular display, comprising:

a first substrate;

a second substrate coupled to and disposed in opposition to the first substrate;

a first line of weakness formed along an axial direction of the first substrate to define a first section and a second section;

a second line of weakness formed along an axial direction of the second substrate to define a third section and a fourth section; and a former having a first side, the former extending between the first section and the third section, and in a deployed position, at least one of the first section or the second section has rotated about the first line of weakness and at least one of the third section or the fourth section has rotated about the second line of weakness to place the second section and the fourth section adjacent to the first side of the former.

2. The triangular display according to claim 1, wherein the first substrate and the second substrate are connected at a first side by a first joint formed from a first flap of the first substrate and a second flap of the second substrate and are connected at a second side by a second joint formed from a third flap of the first substrate and a fourth flap of the second substrate.

3. The triangular display according to claim 2, wherein the third flap is coupled to the second section and the fourth flap is coupled to the fourth section.

4. The triangular display according to claim 1, wherein the first section has a greater length than the second section, and the third section has a length greater than the fourth section.

5. The triangular display according to claim 1, wherein the former is a polygon.

6. The triangular display according to claim 5, wherein the polygon is a trapezoid, and the former includes a first lateral edge, a second lateral edge, a first base and a second base, the first base having a first length and the second base having a second length shorter than the first length.

7. The triangular display according to claim 6, wherein the first lateral edge is attached to the first section and the second lateral edge is attached to the third section.

8. The triangular display according to claim 6, wherein a third line of weakness is formed in a middle portion of the former between the first base and the second base, and wherein, in a stowage position, the former is folded about the third line of weakness to dispose the former in a substantially flat position.

9. The triangular display according to claim 7, wherein the first lateral edge of the former is rotatably connected, via a fourth line of weakness, to a first flap, and wherein the second lateral edge of the former is rotatably connected, via a fifth line of weakness, to a second flap.

10. The triangular display according to claim 9, wherein the first flap is adhered to the first section, and the second flap is adhered to the third section.

11. The triangular display according to claim 6, wherein the second section spans a first half of the first length of the first base, and the fourth section spans a second half of the first length of the first base.

12. The triangular display according to claim 2, wherein the former includes a first attachment feature, and wherein the second joint includes a second attachment feature to attach to the first attachment feature.

13. The triangular display according to claim 12, wherein the first attachment feature includes a female attachment feature, and wherein the second attachment feature includes a male attachment feature dimensioned to cooperatively engage the female attachment feature.

14. The triangular display according to claim 13, wherein the female attachment feature includes an opening formed in an interior portion of the former, and wherein the male attachment feature includes a projecting member projecting from the second joint.

15. The triangular display according to claim 2, wherein the former includes a first notch formed in a portion of the former adjacent the second joint to receive a portion of the second joint.

16. The triangular display according to claim 15, wherein the second joint includes a second notch formed to receive and engage with the first notch.

17. The triangular display according to claim 14, wherein the projecting member includes a first portion extending in a first direction and a second portion extending in a second direction, the second direction being the axial direction.

18. The triangular display according to claim 17, wherein the second portion of the projecting member includes a locking tab.

19. A method of forming a triangular display, comprising:

disposing a first substrate adjacent to a second substrate, the first substrate having a first lateral edge and a second lateral edge, a first flap formed at the first lateral edge, a second flap formed at the second lateral edge, and the second substrate having a third lateral edge and a fourth lateral edge, a third flap formed at the third lateral edge and a fourth flap formed at the fourth lateral edge;

connecting the first flap to the third flap to form a first joint;

connecting the second flap to the fourth flap to form a second joint; and disposing a former to extend between the first substrate and the second substrate, the former having a first line of weakness formed in a middle portion thereof along a direction between the first joint and the second joint, wherein the triangular display is movable between a first position, corresponding to a stowed state in which the former is folded about the first line of weakness to dispose the former in a substantially flat position, and second position, corresponding to an erected state in which the former is substantially planar.

20. The method of forming the triangular display of claim 19, further including:

moving the triangular display from the first position to the second position by moving the first joint toward the second joint.

21. The method of forming the triangular display of claim 20, further including:

rotating a portion of the first substrate about a second line of weakness formed along an axial direction of the first substrate to dispose a first lateral length of the first substrate adjacent a first portion of the former; and rotating a portion of the second substrate about a third line of weakness formed along an axial direction of the second substrate to dispose a second lateral length of the second substrate adjacent a first portion of the former.

22. The method of forming the triangular display of claim 19, further including connecting the second joint to the former.

23. The method of forming the triangular display of claim 22, wherein the connecting of the second joint to the former includes connecting a male attachment feature of the second joint to a female attachment feature of the former.

24. The method of forming the triangular display of claim 22, further including:

disconnecting the second joint and the former; and stowing the triangular display by moving the first joint away from the second joint until the first substrate and the second substrate are substantially flat.

* * * * *